(12) United States Patent
Brink et al.

(10) Patent No.: US 10,529,907 B2
(45) Date of Patent: Jan. 7, 2020

(54) QUBIT NETWORK NON-VOLATILE IDENTIFICATION

(71) Applicant: INTERNATIONAL BUSINESS MACHINES CORPORATION, Armonk, NY (US)

(72) Inventors: Markus Brink, White Plains, NY (US); Jared B. Hertzberg, Ossining, NY (US); Sami Rosenblatt, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/153,866

(22) Filed: Oct. 8, 2018

(65) Prior Publication Data
US 2019/0051810 A1 Feb. 14, 2019

Related U.S. Application Data

(60) Division of application No. 15/813,247, filed on Nov. 15, 2017, now Pat. No. 10,396,268, which is a (Continued)

(51) Int. Cl.
*H01L 39/02* (2006.01)
*G11C 17/18* (2006.01)
(Continued)

(52) U.S. Cl.
CPC ...... *H01L 39/025* (2013.01); *G01R 33/34023* (2013.01); *G11C 11/44* (2013.01); *G11C 17/16* (2013.01); *G11C 17/18* (2013.01); *H01L 23/544* (2013.01); *H01L 27/18* (2013.01); *H01L 39/045* (2013.01); *H01L 39/06* (2013.01); *H01L 39/223* (2013.01); *H01L 39/2493* (2013.01); *H03H 11/02* (2013.01); *H04L 63/0876* (2013.01); *B82Y 10/00* (2013.01); *G06N 10/00* (2019.01); *H01L 2223/54446* (2013.01)

(58) Field of Classification Search
None
See application file for complete search history.

(56) References Cited

U.S. PATENT DOCUMENTS 4,344,052 A 8/1982 Davidson
7,479,652 B2 1/2009 Greentree et al.
(Continued)

FOREIGN PATENT DOCUMENTS

CN 106098926 A 11/2016
EP 1884791 A1 2/2008
(Continued)

OTHER PUBLICATIONS

International Search Report and Written Opinion for Application No. PCT/IB2017/057441 dated Feb. 24, 2018, 9 pages.
(Continued)

*Primary Examiner* — Steven B Gauthier
(74) *Attorney, Agent, or Firm* — Cantor Colburn LLP; Vazken Alexanian

(57) ABSTRACT

A technique relates to a superconducting chip. Resonant units have resonant frequencies, and the resonant units are configured as superconducting resonators. Josephson junctions are in the resonant units, and one or more of the Josephson junctions have a shorted tunnel barrier.

20 Claims, 18 Drawing Sheets

Related U.S. Application Data continuation of application No. 15/598,928, filed on May 18, 2017.

(51) Int. Cl.

| | |
|---|---|
| *H01L 27/18* | (2006.01) |
| *H01L 39/06* | (2006.01) |
| *H01L 39/22* | (2006.01) |
| *H01L 39/24* | (2006.01) |
| *H03H 11/02* | (2006.01) |
| *G11C 11/44* | (2006.01) |
| *G11C 17/16* | (2006.01) |
| *G01R 33/34* | (2006.01) |
| *H01L 23/544* | (2006.01) |
| *H01L 39/04* | (2006.01) |
| *H04L 29/06* | (2006.01) |
| *G06N 10/00* | (2019.01) |
| *B82Y 10/00* | (2011.01) |

(56) References Cited

U.S. PATENT DOCUMENTS

| | | | |
|---|---|---|---|
| 7,889,992 | B1 | 2/2011 | Divincenzo et al. |
| 8,018,244 | B2 | 9/2011 | Berkley |
| 8,138,784 | B2 | 3/2012 | Przybysz et al. |
| 8,437,818 | B1 | 5/2013 | Tolpygo et al. |
| 2004/0155237 | A1 | 8/2004 | Kerber |
| 2010/0176920 | A1 | 7/2010 | Kursawe et al. |
| 2011/0012619 | A1 | 1/2011 | Ketchen et al. |
| 2011/0057169 | A1 | 3/2011 | Harris et al. |
| 2013/0015885 | A1 | 1/2013 | Naaman et al. |
| 2014/0167811 | A1 | 6/2014 | Gambetta et al. |
| 2014/0235450 | A1 | 8/2014 | Chow et al. |
| 2015/0101037 | A1 | 4/2015 | Yang et al. |
| 2015/0262662 | A1 | 9/2015 | Andre |
| 2016/0065693 | A1 | 3/2016 | Rose et al. |
| 2016/0191060 | A1 | 6/2016 | McDermott, III |
| 2016/0308502 | A1 | 10/2016 | Abdo et al. |
| 2016/0335558 | A1 | 11/2016 | Bunyk et al. |
| 2017/0076787 | A1 | 3/2017 | Frank |
| 2018/0337322 | A1 | 11/2018 | Brink et al. |
| 2018/0337790 | A1 | 11/2018 | Brink et al. |
| 2018/0337792 | A1 | 11/2018 | Brink et al. |
| 2019/0006284 | A1 | 1/2019 | Brink et al. |

FOREIGN PATENT DOCUMENTS

| | | |
|---|---|---|
| WO | 2015035053 A1 | 3/2015 |
| WO | 2016018503 A1 | 2/2016 |
| WO | 2016085629 A1 | 6/2016 |

OTHER PUBLICATIONS

International Search Report and Written Opinion for Application No. PCT/IB2017/057677 dated Feb. 12, 2018, 9 pages.

Meckbach et al., "Sub-µm Josephson Junctions for Superconducting Quantum Devices", IEEE, 2013, pp. 1-4.

Zhou et al., "Identification of Markovian open system dynamics for qubit systems", Chinese Science Bulletin 57.18, 2012, pp. 2242-2246.

List of IBM Patents or Patent Applications Treated as Related; (Appendix P), Filed Feb. 1, 2019, 2 pages.

List of IBM Patents or Patent Applications Treated as Related; (Appendix P), Filed Oct. 8, 2018; pp. 1-2.

Markus Brink et al., "Qubit Network Non-Volatile Identification", Related Application, U.S. Appl. No. 15/813,247, filed Nov. 15, 2017.

Markus Brink et al., "Qubit Network Non-Volatile Identification", Related Application, U.S. Appl. No. 15/598,928, filed May 18, 2017.

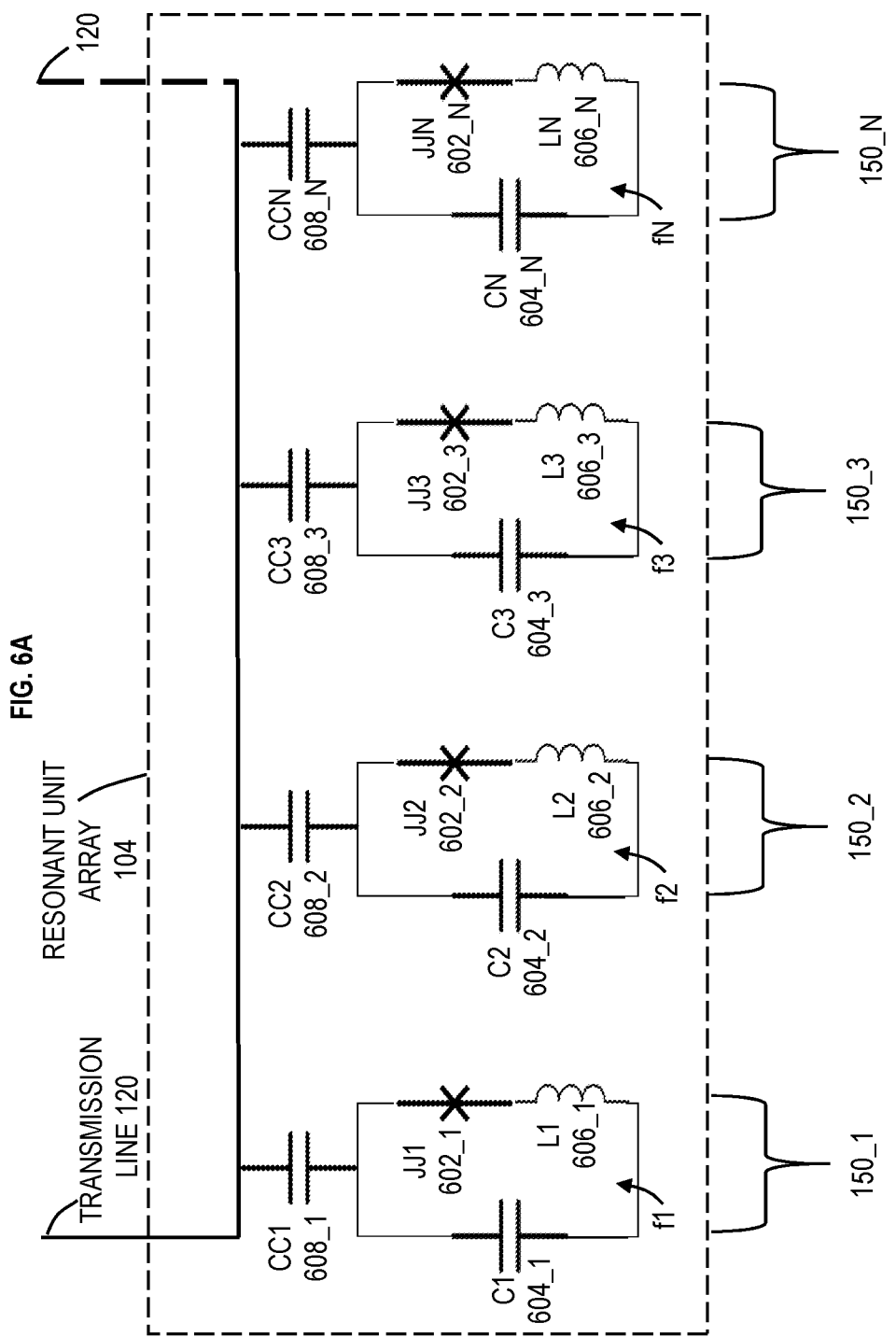

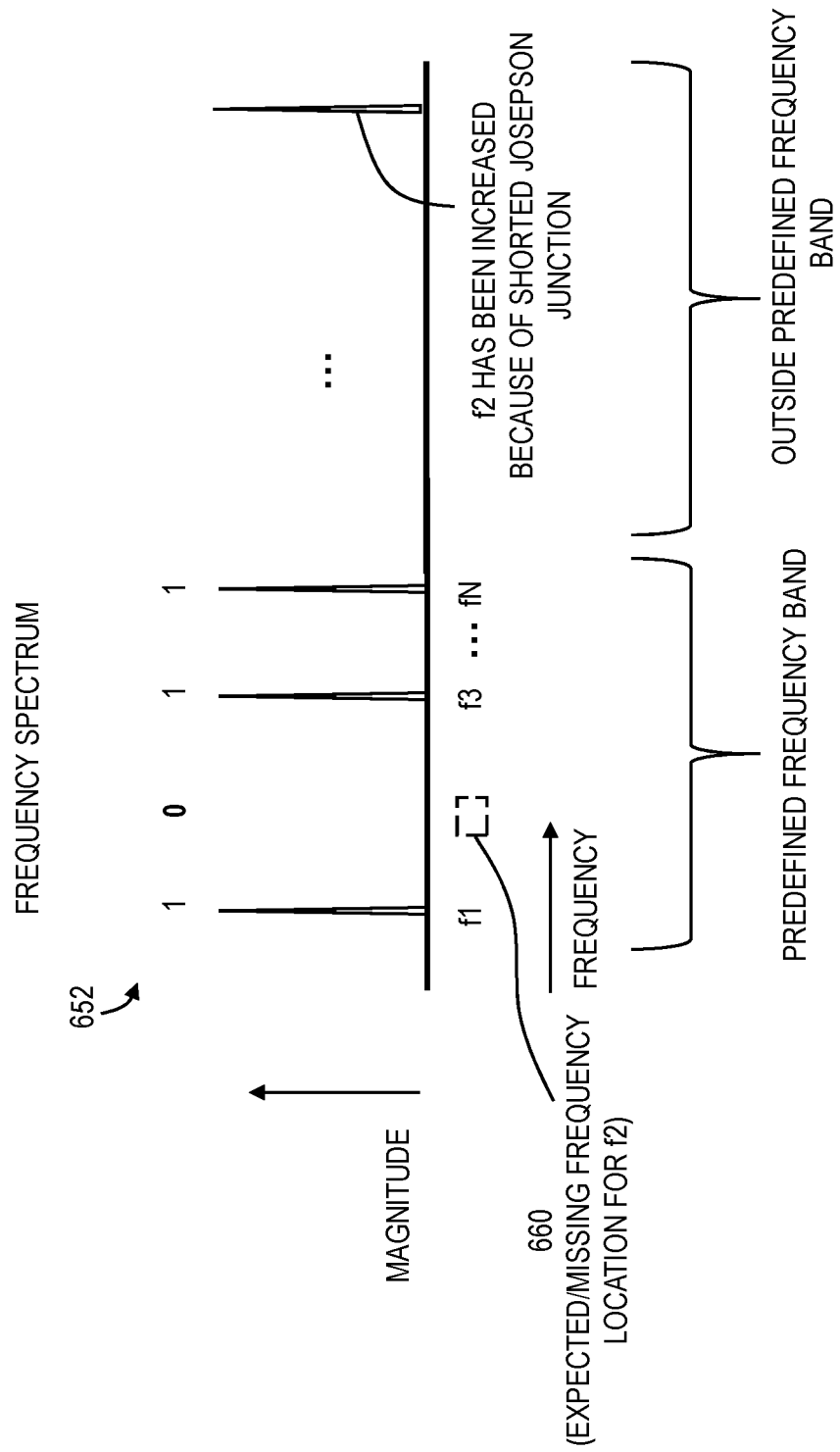

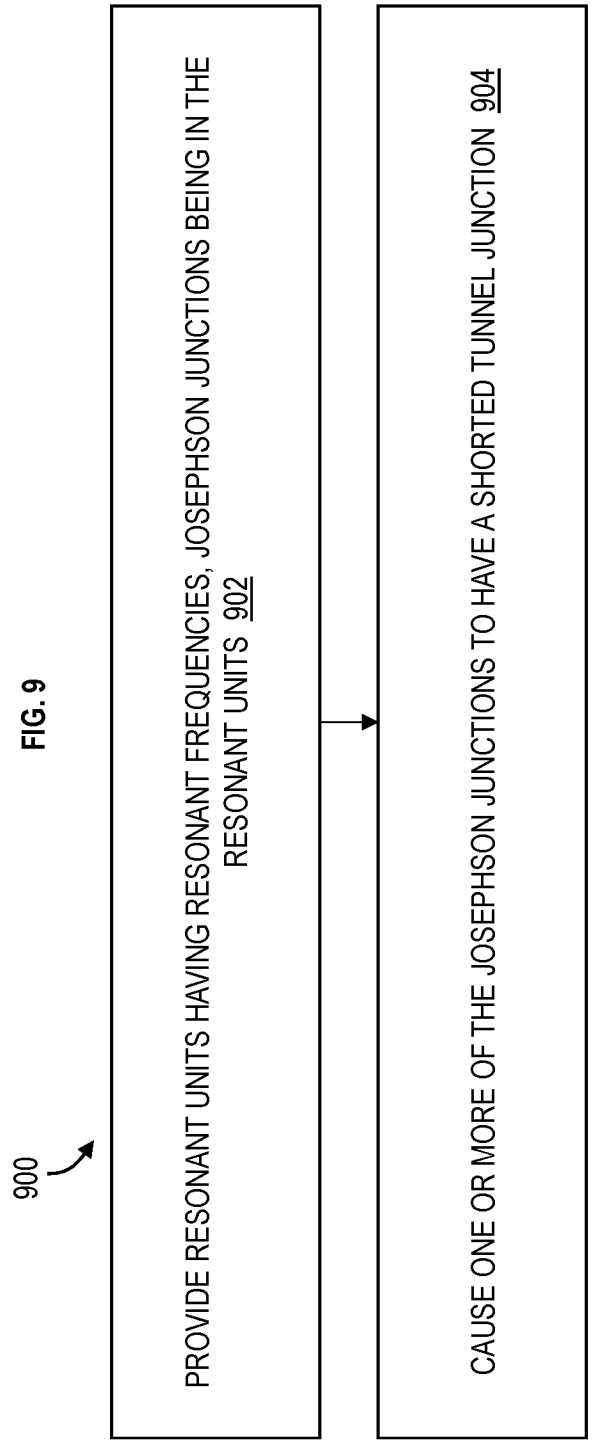

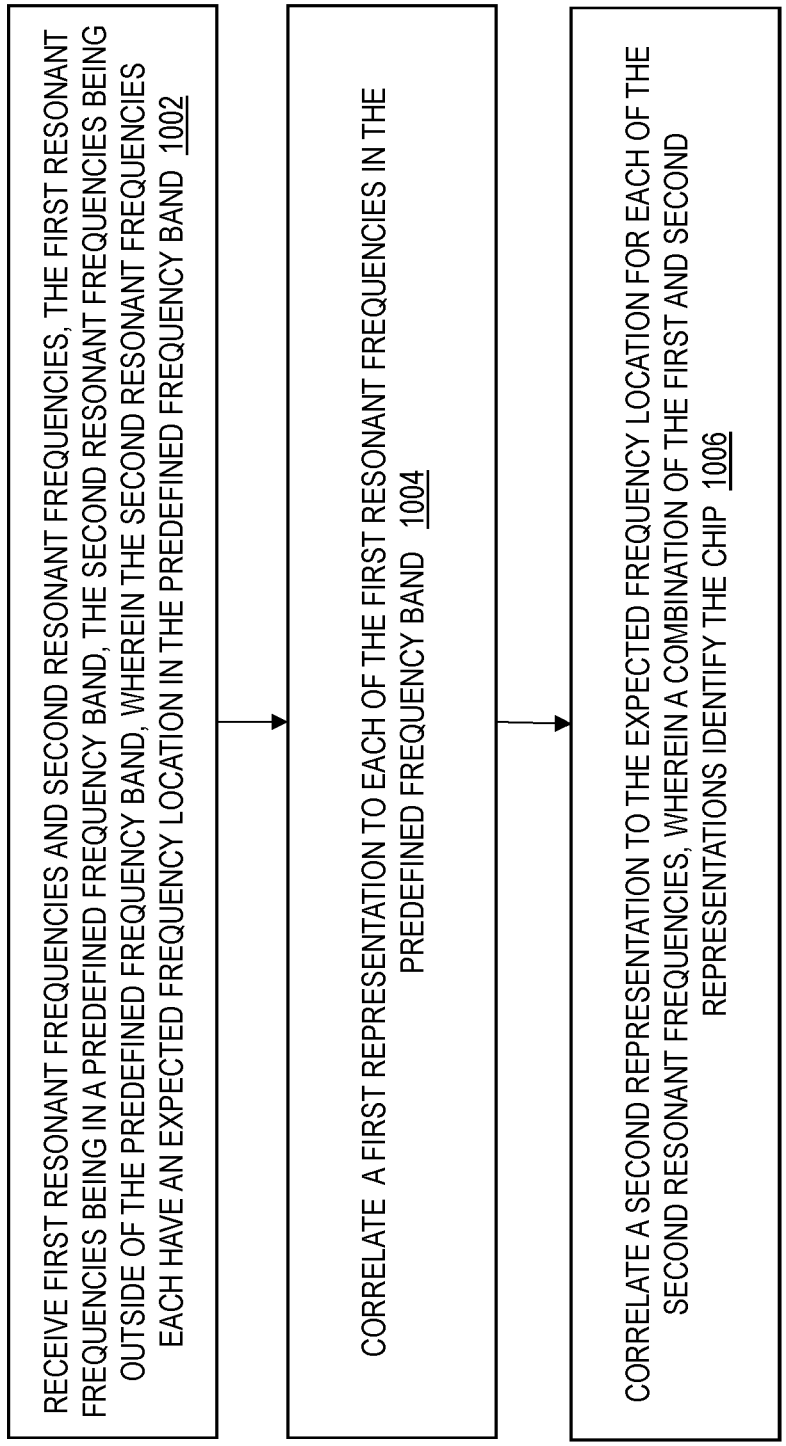

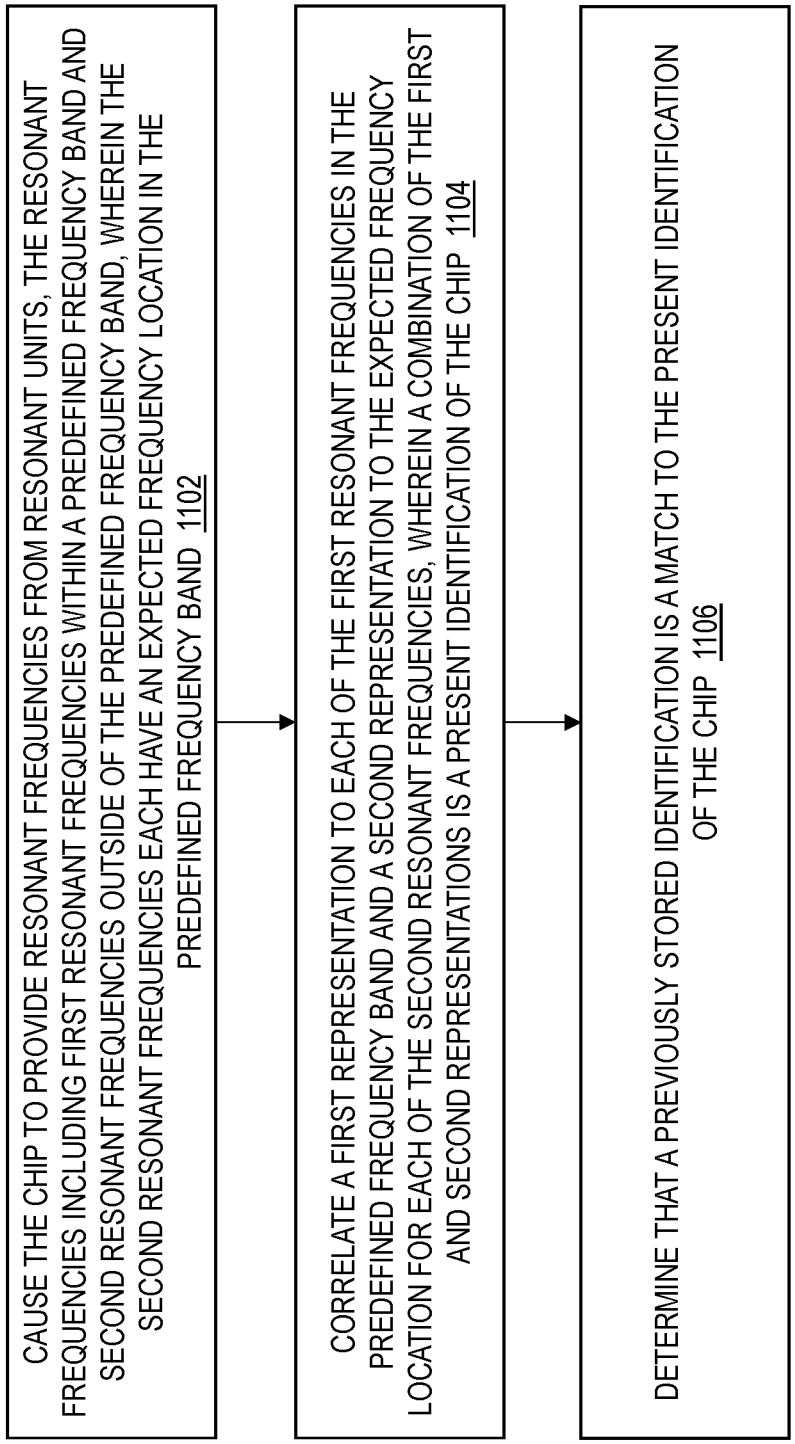

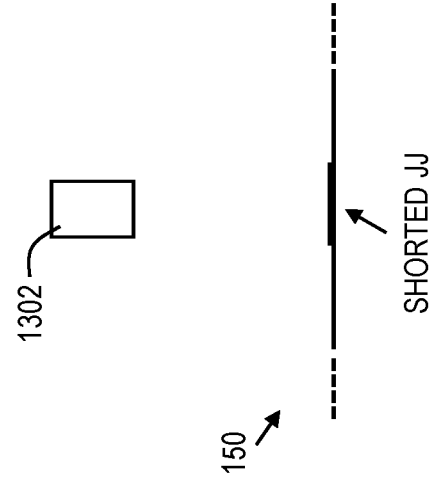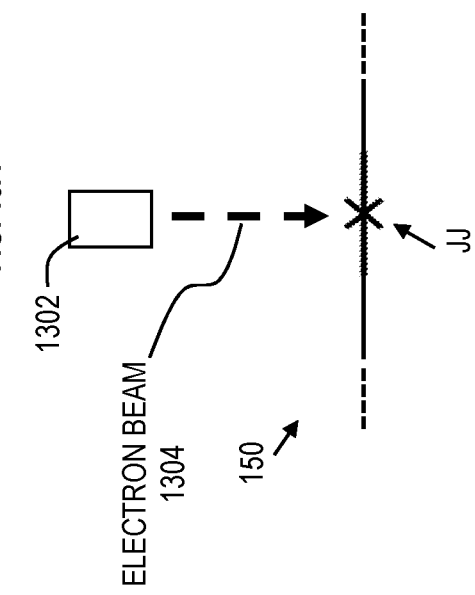

QUBIT NETWORK NON-VOLATILE IDENTIFICATION

DOMESTIC PRIORITY

This application is a divisional of U.S. application Ser. No. 15/813,247, titled "QUBIT NETWORK NON-VOLATILE IDENTIFICATION", filed Nov. 15, 2017, which is a continuation of U.S. application Ser. No. 15/598,928, titled "QUBIT NETWORK NON-VOLATILE IDENTIFICATION", filed May 18, 2017, the contents of which are incorporated by reference herein in their entirety.

BACKGROUND

The present invention generally relates to superconducting devices. More specifically, the present invention relates to qubit network non-volatile identification.

Non-volatile memory, nonvolatile memory, NVM, or non-volatile storage is a type of computer memory that can retrieve stored information even after having been power cycled (i.e., repeatedly turned off and back on). Examples of non-volatile memory include read-only memory, flash memory, ferroelectric random access memory, most types of magnetic computer storage devices (e.g., hard disk drives, floppy disks, and magnetic tape), optical discs, and early computer storage methods such as paper tape and punched cards. Non-volatile memory is typically used for the task of secondary storage or long-term persistent storage. The most widely used form of primary storage today is a volatile form of random access memory (RAM), which means that when the computer is shut down, anything contained in RAM is lost. Non-volatile data storage can be categorized in electrically addressed systems (read-only memory) and mechanically addressed systems (hard disks, optical disc, magnetic tape, holographic memory, and such).

In computing, eFUSE is a technology invented by IBM® which allows for the dynamic real-time reprogramming of computer chips. Computer logic is generally "etched" or "hard-coded" onto a chip and cannot be changed after the chip has finished being manufactured. By utilizing a set of eFUSEs, a chip manufacturer can allow for the circuits on a chip to change while it is in operation. Additionally, eFUSEs can be utilized to identify the chip or to store information about faulty bits in other memory, for the purpose of replacing them with redundant ones, to cite a few applications.

New ways of creating identifications using non-volatile memory/devices are needed, in particular, memory elements compatible with non-traditional computing platforms. As the number of systems carrying superconducting chips operated at cryogenic temperatures increases, so does the need for non-volatile memory for such chips. Distributing workloads across a network of such chips can be accomplished by identification, which in turn can be implemented with non-volatile memory. But there are scarce simple non-volatile memories that are compatible with operation at cryogenic temperatures.

SUMMARY

Embodiments of the present invention are directed to a superconducting chip. A non-limiting example of a superconducting chip includes resonant units having resonant frequencies, where the resonant units are configured as superconducting resonators, and Josephson junctions in the resonant units. One or more of the Josephson junctions have a shorted tunnel barrier.

Embodiments of the present invention are directed to a method of forming a superconducting chip. A non-limiting example of the method of forming the superconducting chip includes providing resonant units having resonant frequencies, Josephson junctions being in the resonant units, and causing one or more of the Josephson junctions to have a shorted tunnel barrier.

Embodiments of the present invention are directed to a method of identifying a superconducting chip. A non-limiting example of the method of identifying the superconducting chip includes receiving first resonant frequencies and second resonant frequencies. The first resonant frequencies are in a predefined frequency band, and the second resonant frequencies are outside of the predefined frequency band. The second resonant frequencies each have an expected frequency location in a different predefined frequency band. The method includes correlating a first representation to each of the first resonant frequencies in the predefined frequency band, and correlating a second representation to the expected frequency location for each of the second resonant frequencies, where a combination of the first and second representations identify the superconducting chip.

Embodiments of the present invention are directed to a method of causing identification of a superconducting chip. A non-limiting example of the method of causing identification of the superconducting chip includes causing the superconducting chip to provide resonant frequencies from resonant units. The resonant frequencies include first resonant frequencies within a predefined frequency band and second resonant frequencies outside of the predefined frequency band, where the second resonant frequencies each have an expected frequency location in a different predefined frequency band. The method includes correlating a first representation to each of the first resonant frequencies in the predefined frequency band and a second representation to the expected frequency location for each of the second resonant frequencies, where a combination of the first and second representations is a present identification of the superconducting chip. Also, the method includes determining that a previously stored identification is a match to the present identification of the superconducting chip.

Embodiments of the present invention are directed to a superconducting chip. A non-limiting example of the superconducting chip includes one or more non-shorted Josephson junctions in first resonant units. The first resonant units have first resonant frequencies, where the one or more non-shorted Josephson junctions cause the first resonant frequencies to be present in a predefined frequency band. The predefined frequency band is determined in advance. Also, the superconducting chip includes one or more shorted Josephson junctions in second resonant units. The second resonant units have second resonant frequencies, where the one or more shorted Josephson junctions cause the second resonant frequencies to be absent from the predefined frequency band. An identification of the superconducting chip includes representation of both a presence of the first resonant frequencies and an absence of the second resonant frequencies in the predefined frequency band.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6A depicts an example resonant unit array according to embodiments of the present invention;

FIG. 6D depicts a frequency spectrum for a programmed resonant unit array according to embodiments of the present invention;

FIG. 9 depicts a flow chart of a method of forming a superconducting chip according to embodiments of the present invention.

FIG. 10 depicts a flow chart of a method of identifying a superconducting chip according to embodiments of the present invention;

FIG. 11 depicts a flow chart of a method of causing identification of a superconducting chip according to embodiments of the present invention;

FIG. 13A depicts a partial view of a resonant unit having a non-shorted Josephson junction according to embodiments of the present invention; and FIG. 13B depicts a partial view of the resonant unit having a shorted Josephson junction according to embodiments of the present invention.

Figure 1:
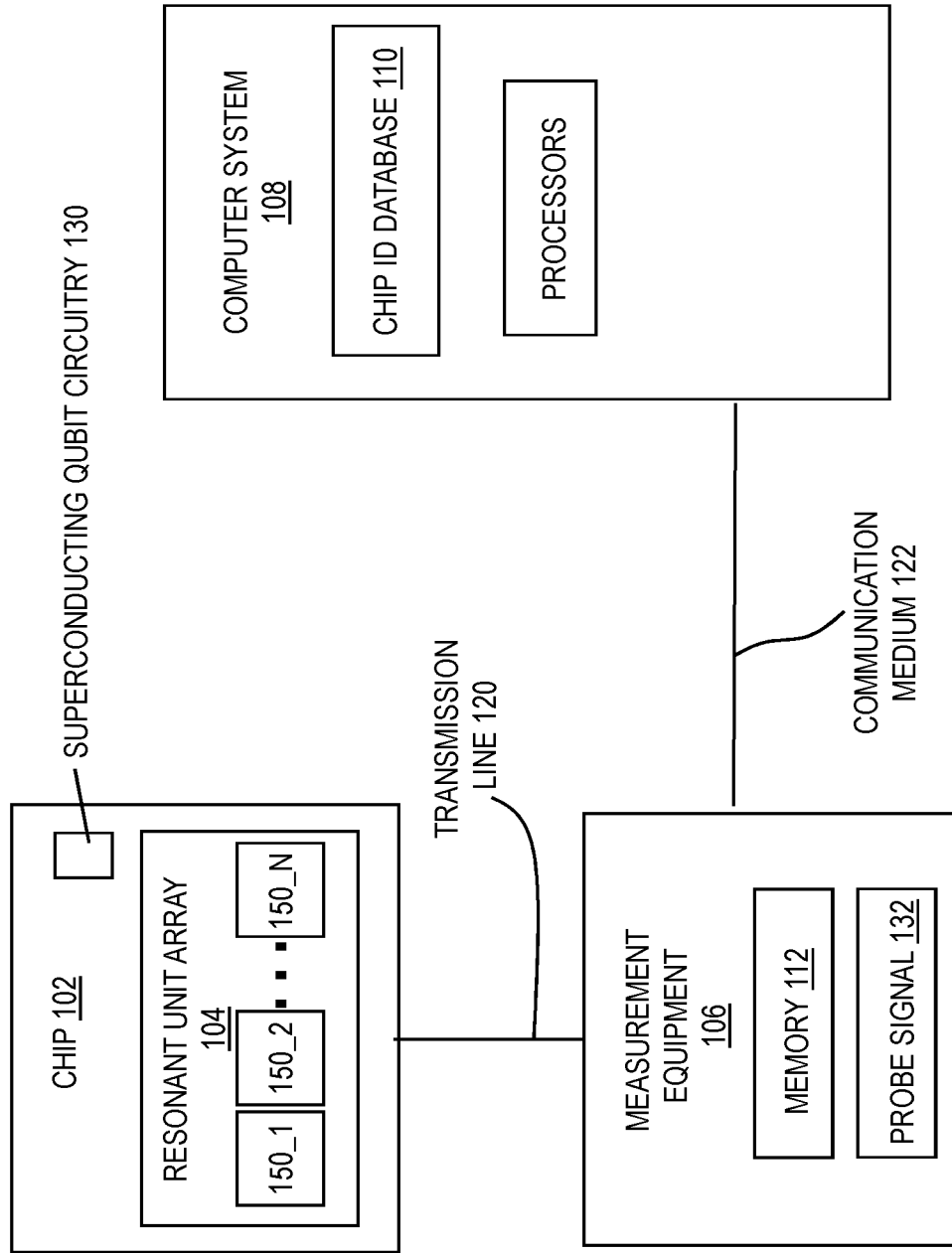
FIG. 1 depicts a schematic of an identification system that provides identification of superconducting qubit chips according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, numerous chips are utilized in server farms. A server farm or server cluster is a collection of computer servers, usually maintained by an organization to supply server functionality far beyond the capability of a single machine. Server farms often consist of thousands of computers. As superconducting quantum computing hardware production scales up, a need emerges for means to identify chips in a superconducting quantum computing network (e.g., numerous superconducting quantum computers like a server farm in which each quantum computer has at least one superconducting chip) while in operation. For a small number of packaged chips, an inventory can be made to track computing resources. For a network, it is useful and desirable to be able to identify the superconducting chip itself. Ideally, this needs to be done in the same environment as the functional hardware and using the same type of measurement tools. In complementary metal-oxide-semiconductor (CMOS), this is usually accomplished by the addition of NVRAM, such as eFUSE. In eFUSE, bits are programmed during a registration phase prior to deployment in the field, and NVRAM does not lose information after power is turned off (as opposed to static random access memory (SRAM) or dynamic random access memory (DRAM)).

Turning now to an overview of the aspects of the invention, one or more embodiments of the invention address the above-described shortcomings of the prior art by providing qubit network non-volatile identification. In accordance with embodiments of the invention, a quantum analog for superconducting quantum chips is provided which requires programmable bits that can be read out using microwave circuitry. This type of NVRAM minimizes the use of precious real-estate (i.e., space or area) on a chip. More specifically, the above-described aspects of the invention address the shortcomings of the prior art by providing an authentication system that can be readily integrated with superconducting qubit chip fabrication and can be read out with the same equipment and techniques for typical superconducting qubit chips. Superconducting tunnel junctions (also referred to as Josephson junctions) used in superconducting quantum chips exhibit a Josephson inductance when in the superconducting state, which at low-to-moderate powers is functionally equivalent to a conventional inductor within the circuit. Embodiments of the invention are configured to eliminate the Josephson inductance (by short circuiting) of Josephson junctions in desired resonant units to configure an identification for the superconducting chip.

Superconducting tunnel junctions (Josephson junctions) used in superconducting chips are susceptible to shorting through the tunnel barrier. The tunnel barrier is often a dielectric material. In the superconducting state, a Josephson junction exhibits a Josephson inductance as noted above. Shorting the Josephson junction can be caused by electrostatic discharge (ESD) or a high enough current for Josephson junctions such that breakdown of the thin barrier material occurs. This breakdown causes a permanent short (i.e., short circuit) between the two superconducting electrodes (e.g., superconducting metal) that sandwich the tunnel junction. Accordingly, this provides a path under which these tunnel junctions can be programmed as a short, therefore creating a substantially different resistance state (and inductance) from the initially-fabricated junction according to embodiments of the invention. As such, resonant units having shorted Josephson junctions and regular Josephson junctions (i.e., non-shorted Josephson junctions) can be read out to thereby provide a non-volatile identification of the superconducting quantum chip. The quantum analog for superconducting quantum chips provides an identification that can be read out using microwave circuitry just as a typical superconducting qubit. The identification allows for each superconducting quantum chip in a (superconducting) server farm/network to be uniquely identified in situ (i.e., under superconducting temperatures such as in a dilution refrigerator).

Figure 2:
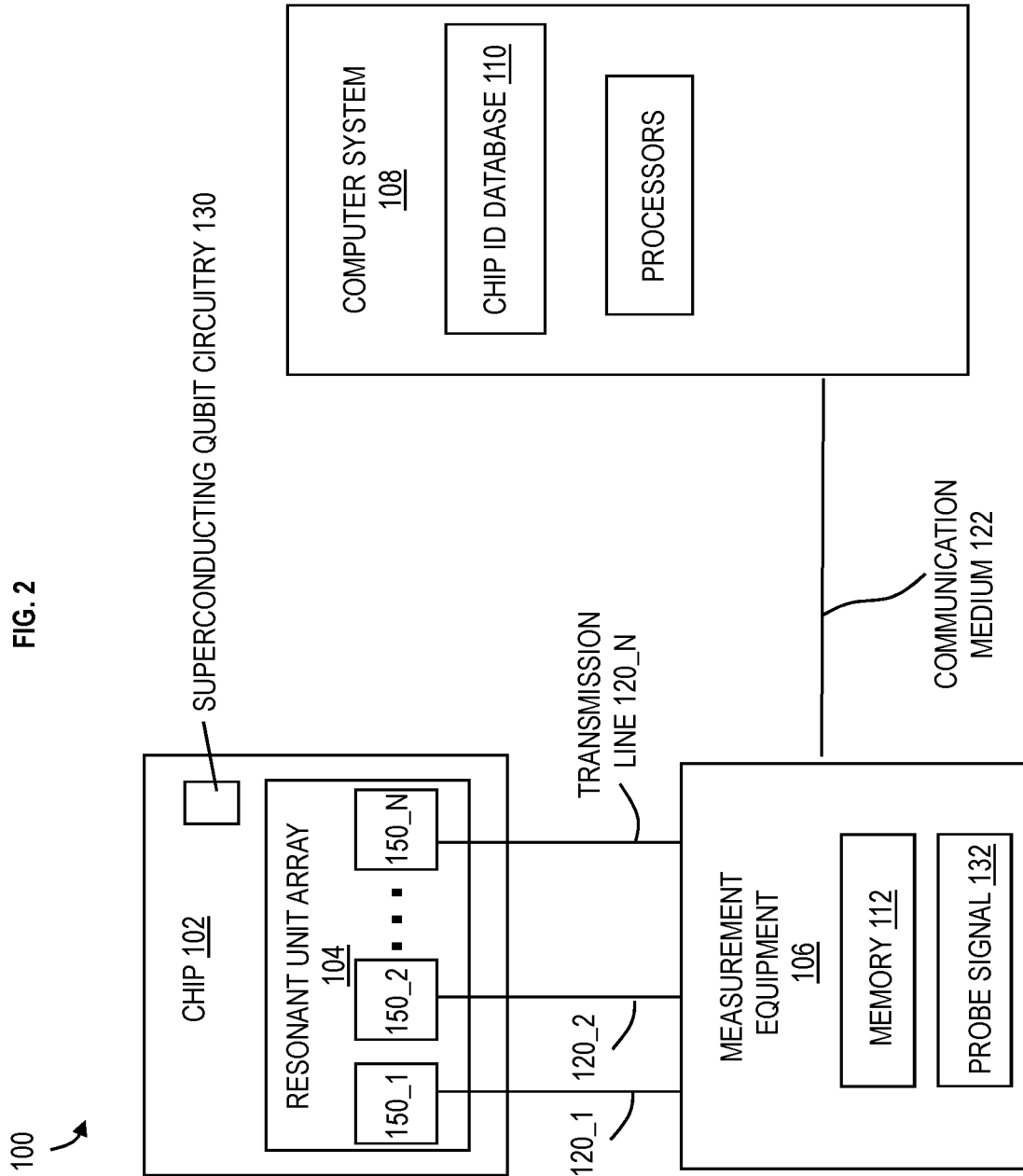
FIG. 2 depicts a schematic of the identification system that provides identification of superconducting qubit chips according to embodiments of the present invention.

Turning now to a more detailed description of aspects of the present invention, FIG. 1 depicts a schematic of an identification system 100 configured to provide programmed non-volatile identification of superconducting chips where readout is collectively performed according to embodiments of the present invention. FIG. 2 depicts a schematic of the identification system 100 configured to provide programmed non-volatile identification of superconducting chips where readout is individually addressable according to embodiments of the present invention.

The identification system 100 includes a superconducting chip 102. The superconducting chip 102 includes a resonant unit array 104 along with other types of circuitry utilized for quantum computing. For example, other circuitry can include superconducting qubit circuitry 130 utilized for superconducting quantum computing as understood by one skilled in the art. There are various ways to perform quantum computing via superconducting qubit circuitry 130, and typical superconducting qubit circuitry 130 will include the superconducting qubits, readout resonators, coupling resonators, coupling capacitors, coupling inductors and other superconducting circuit elements used for quantum computation. The combination of all these necessary elements is understood by one skilled in the art, and the details are not discussed herein. The superconducting chip 102 operates at superconducting temperatures. The superconducting chip 102 can be cooled by a cryogenic device (not shown) such as a dilution refrigerator.

The resonant unit array 104 includes resonant units 150_1 through 150_N. Each resonant unit 150_1 through 150_N contains a Josephson junction, along with a capacitor, and an inductor, either in lumped or distributed form. Various configurations of an individual resonant unit 150 are illustrated in FIGS. 5A, 5B, 5C, 5D, 5E, 5F, 5G, and 5H. Each resonant unit 150_1 through 150_N is a resonator with a unique resonant (or resonance) frequency that can be read out in the same manner that a typical superconducting qubit circuitry 130 is read out. For example, the resonant units 150_1 through 150_N have individual resonant frequencies f1 through fN. Typical superconducting qubit circuitry 130 are made and utilized for quantum computations and/or quantum operations (such as entanglement, etc.).

The resonant frequency of each resonant unit 150_1 through 150_N can be read out using measurement equipment 106, which is the same equipment used to read out typical superconducting qubit circuitry 130. The measurement equipment 106 is operatively connected to resonant units 150_1 through 150_N of the resonant unit array 104 on chip 102 via transmission line 120. Unlike FIG. 1, FIG. 2 depicts an example in which each of the resonant units 150_1 through 150_N is individually addressable via transmission lines 120_1 through 120_N. The transmission lines 120_1 through 120_N are feedlines for transmitting and receiving signals (e.g., microwave signal). The transmission lines 120 can be coaxial lines or waveguides. The transmission lines are one type of transmission medium. Another example transmission medium can be a three-dimensional microwave cavity, which can be utilized for readout of the resonant unit array 104. The transmission medium and resonant units 150_1 through 150_N share the same chip 102 with typical superconducting qubit circuitry 130 and other superconducting circuit elements used for quantum computation. Therefore, any implementation must prevent the leakage of quantum information from the superconducting qubit circuitry 130 into the resonant unit array 104. In one implementation, the resonant unit array 104 is strictly separated from the superconducting qubit circuitry 130 by distance on the chip 102 and by grounded shielding incorporated into the chip 102, so as to prevent any capacitive or inductive coupling between the two types of circuitry 104 and 130. In this case, the resonant units 150_1 through 150_N can have resonant frequencies f1 through fN of any value. In another implementation, capacitive or inductive coupling can exist between the two types of circuitry 104 and 130. In this case, the resonant units 150_1 through 150_N must be made so that their resonant frequencies f1 through fN do not overlap the frequencies of the superconducting qubit circuitry 130 utilized for quantum computing. Another implementation in which resonant frequencies f1 through fN might overlap the frequencies of the superconducting qubit circuitry 130 is to add a switch that connects to each of the resonant units 150_1 through 150_N to ground when closed. The switch is closed during the superconducting operation of the superconducting qubit circuitry 130. When open, the resonant units 150_1 through 150_N are not connected to ground and the superconducting qubit circuitry 130 is not performing quantum computing.

The measurement equipment 106 can include a probe signal 132. The probe signal 132 can be produced by a signal generator (e.g., integrated in the measurement equipment 106) configured to generate radio frequency signals (which can be pulses) at desired radio frequencies such as, for example, microwave signals. In order to read the identification of the resonant units 150_1 through 150_N, the probe signal 132 is configured to generate microwave signals to sweep the frequencies across the desired/predefined frequencies and transmit to the resonant units 150_1 through 150_N of the resonant unit array 104. FIG. 1 depicts that the probe signal 132 transmits the radio frequency signal (being a sweep of the desired radio frequencies) to the resonant units 150_1 through 150_N collectively (via transmission line 120). In other words, the measurement equipment 106 is configured to transmit the radio frequency signal (covering all of the predefined frequencies) to each of the resonant units 150_1 through 150_N at once using the same transmission medium (e.g., transmission line 120 or a microwave cavity). FIG. 2 depicts that the probe signal 132 transmits the microwave signal (being a sweep of the desired frequencies) to the resonant units 150_1 through 150_N individually (via transmission lines 120_1 through 120_N). In FIG. 2, the resonant units 150_1 through 150_N can be isolated and each accessed via an individual transmission line, such that the radio frequency signal is switched between these transmission lines 120_1 through 120_N. In one implementation, the radio frequency signal (being a sweep of the desired frequencies) can be simultaneously or nearly simultaneously transmitted on each individual transmission line 120_1 through 120_N to the respective resonant units 150_1 through 150_N. Because the measurement equipment 106 via the probe signal 132 is configured to generate radio frequency signals with predefined frequencies to individually address the resonant units 150_1 through 150_N via individual transmission lines 120_1 through 120_N as depicted and because resonant units 150_1 through 150_N have individual transmission lines 120_1 through 120_N, the resonant frequency can be the same for each resonant units 150_1 through 150_N as long as the resonant units 150_1 through 150_N are individually read out.

In both cases (FIG. 1 and FIG. 2), the radio frequency signal is directed at resonant units 150_1 through 150_N individually and/or directed at the entire array of resonant units 150_1 through 150_N (collectively). In advance, the measurement equipment 106 knows the expected/predefined resonant frequencies for resonant units 150_1 through 150_N such that the frequency range (or frequency band) of the radio frequency signal (transmitted to the resonant unit array 104) is intended to match/coincide with the expected resonant frequencies for resonant units 150_1 through 150_N. The measurement equipment 106 is configured to operate automatically (via processors executing computer instructions) and/or with assistance from an operator.

Although transmission lines 120_1 through 120_N are shown as the channels for directing the radio frequency signal (and likewise receiving responses back from the resonant units 150_1 through 150_N), the channel can be a three-dimensional microwave cavity as understood by one skilled in the art. Also, each transmission line 120 can be representative of two transmission lines when readout is in transmission.

While considering resonant unit 150_1 for explanation purposes, it should be appreciated that the following discussion applies by analogy for each of the resonant units 150_2 through 150_N. If the frequency of radio frequency signal (i.e., the challenge) equals the resonant frequency of resonant unit 150_1, this will be evident in the phase or amplitude of the radio frequency energy reflected or transmitted from resonant unit 150_1 through the transmission line 120 (or transmission line 120_1). For example, assuming that the resonant unit 150_1 has a resonant frequency f1, the response/return radio frequency energy/signal will have a peak in amplitude at frequency f1 and a 180 degree phase shift centered at frequency f1. To read the full identification (fingerprint) of the resonant unit array 104, the probe signal 132 must sweep the frequency of the radio frequency signal over the range of resonant frequencies present in all the resonant units 150_1 through 150_N (for example, from 3 gigahertz (GHz) to 10 GHz) and the probe signal must direct the swept radio frequency signal at all of the resonant units 150_1 through 150_N. Accordingly, all the resonant units 150_1 through 150_N will return radio frequency energy/signals having a peak in amplitude at their respective resonant frequencies f1 through fN and a 180 degree phase shift centered at respective resonant frequencies f1 through fN. Although peaks in the frequency spectrum are utilized for explanation purposes, it should be noted that the measurement is not limited to measuring peaks. In some implementations, each of the peaks can be a dip depending on the measurement and other system parameters, such that identification is based on measuring dips.

As the response to the previously transmitted radio frequency signal to the resonant units 150_1 through 150_N, the measurement equipment 106 can receive a sequence of the resonant frequencies f1 through fN where the frequency response is utilized as a binary representation of zeros (0) and ones (1) as the identification of the chip 102 as discussed further herein. The sequence of the resonant frequencies f1 through fN can be stored in the memory 112 and/or be stored separately. After receiving the response (returned signals) from resonant units 150_1 through 150_N of the resonant unit array 104, the measurement equipment 106 is configured to perform a spectral analysis to determine/identify the spectrum of frequencies (peaks) in frequency space for the response received from the resonant units 150_1 through 150_N. In one implementation, the measurement equipment 106 is configured to identify the resonant frequencies f1 through fN for each of the resonant units 150_1 through 150_N as the peaks at frequencies f1 through fN within a predefined frequency band. The predefined frequency band is a range of frequencies known (expected) in advance by the measurement equipment 106.

In some embodiments of the present invention, the chip 102 is cryogenically cooled and its resonance frequencies are measured after fabrication to test that the resonant units 150_1 through 150_N are functioning. This spectrum is stored as a reference. The chip 102 is then programmed (i.e., desired bits are shorted). The chip 102 is then used in quantum computing operations (i.e., during cooling). When the chip's identification is required, the spectrum is measured and compared to the reference spectrum. Large deviations in any resonance lines indicate a flipped bit.

In other embodiments, the chip 102 is fabricated, and the bits are programmed (before cooling). The chip is then cryogenically cooled and measured to produce a reference spectrum, which is enrolled (i.e., stored) in the chip ID database 110. The chip 102 is then used in quantum computing operations (i.e., during cooling). When the chip's identification is required during authentication, the spectrum is measured. A match against the reference spectrum identifies the chip 102.

The sequence of the resonant frequencies f1 through fN can be transmitted from the measurement equipment 106 to a computer system 108 via a communication medium 122. The communication medium 122 can be a wired (Ethernet cable, USB cable, optical fiber cable, coaxial cable, and twisted pair cable, etc.) or a wireless connection. The computer system 108 has one or more processors. Similarly, the measurement equipment 106 can have one or more processors. The computer system 108 is configured to compare the binary representation (derived from the sequence of the resonant frequencies f1 through fN including the absence of any resonant frequencies in the predefined frequency band) received from the measurement equipment 106 with various chip identification numbers previously stored for similar chips 102 in a chip identification database 110. The computer system 108 is configured to determine whether the received binary representation (derived from the sequence of the resonant frequencies f1 through fN within the predefined frequency band and absent from the predefined frequency band) matches a previously stored binary representation (from a sequence of the resonant frequencies). The chip 102 can be representative of numerous chips. The chip identification database 110 can include the chip identification numbers for numerous chips 102. Each chip 102 could be utilized in a network of superconducting quantum computers in order to perform quantum computing as understood by one skilled in the art. The respective chip identification numbers for all chips 102 are readout and stored in advance as a binary representation in the chip identification database 110. Each chip 102 could have been read out and stored by the manufacturer of the chips 102. Also, each chip 102 could have been read out and stored by the operator (end user) of the chips 102 who has deployed the chips in the network of superconducting quantum computers.

Figure 3:
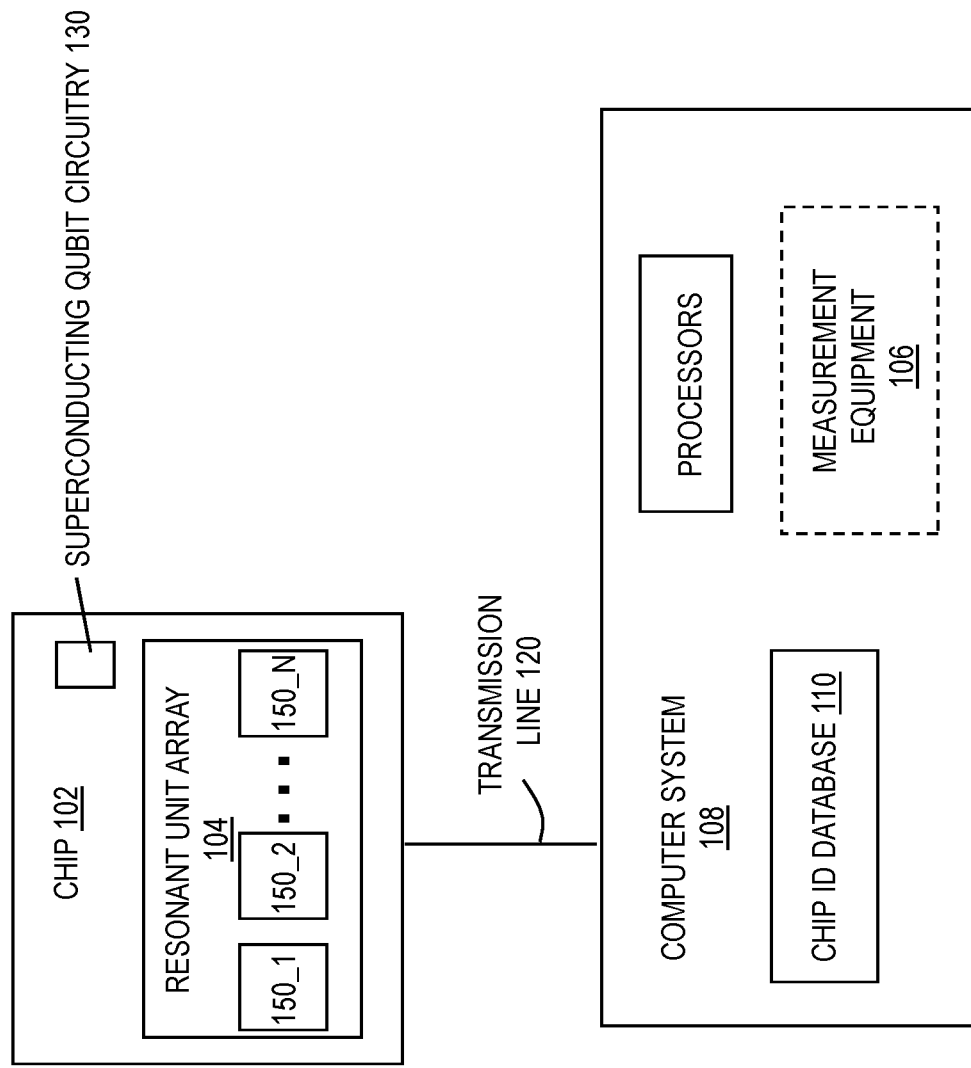
FIG. 3 depicts a schematic of an identification system where resonant units are addressed collectively according to embodiments of the present invention.
Figure 4:
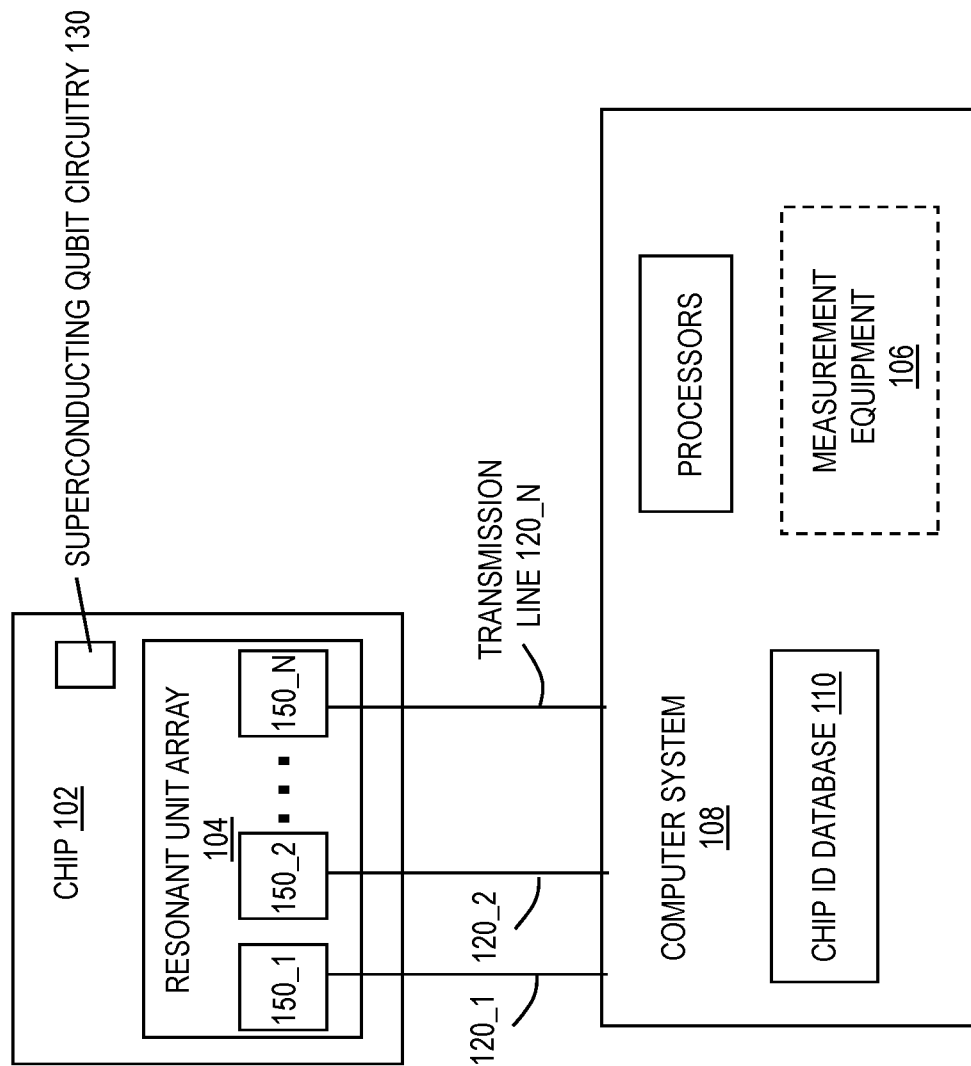
FIG. 4 depicts a schematic of the identification system where resonant units are individually addressed according to embodiments of the present invention.

In some embodiments of the present invention, the computer system 108 can be integrated with the measurement device 106 as illustrated in FIGS. 3 and 4. FIG. 3 depicts a schematic of an identification system 100 where the resonant units 150_1 through 150_N of the resonant unit array 104 are addressed collectively through the transmission line 120 according to embodiments of the present invention. In other words, the radio frequency signal (challenge) can be sent from the measurement equipment 106 over the same transmission line(s) to all of the resonant units 150_1 through 150_N and the responses are received back over the same transmission line(s). FIG. 4 depicts a schematic of the identification system 100 where the resonant units 150_1 through 150_N of the resonant unit array 104 are individually addressed through the transmission lines 120_1 through 120_N according to embodiments of the present invention. In FIGS. 3 and 4, the measurement equipment 106 does not have to transmit the converted binary representation (or received sequence of the resonant frequencies f1 through fN) to the computer system 108. Instead, the computer system 108 having the functionality of the measurement equipment (or vice versa) can immediately compare the received binary representation (of the sequence of the resonant frequencies f1 through fN) to the chip identification numbers stored in the chip identification database 110 and then identify the chip 102 as chip ID1 (or chip XYZ).

Now turning to more detail regarding the resonant units 150_1 through 150_N, each resonant unit has at least one Josephson junction. The resonant units 150_1 through 150_N are similar to typical superconducting qubits but have less stringent requirements. A typical superconducting qubit has to be manufactured such that it has long relaxation and coherence times T1 and T2 and such that the qubit can retain its quantum state information. In typical superconducting qubits, the qubit state can be high $|1\rangle$, low $|0\rangle$, or a mathematical superposition of both high and low. Additionally, typical superconducting qubits utilized for quantum computing (such as quantum computing superconducting qubit circuitry 130) cannot be read out directly. Instead, a readout resonator is required to be read out such that the quantum information (i.e., state) of the typical superconducting qubits can be inferred based at least in part on the microwave signal received back from reading out the readout resonator. Typical superconducting qubits need coupling capacitors to separate each typical superconducting qubit from its readout resonator. Also, typical superconducting qubits need coupling capacitors to separate the typical superconducting qubits from one another. However, resonant units 150_1 through 150_N do not need to maintain state information and therefore are not limited by requirements to maintain long times T1 and T2. Also, the resonant units 150_1 through 150_N can be read out directly by causing the resonant units 150_1 through 150_N to each resonate at their respective resonant frequencies f1 through fN. Additionally, resonant units 150_1 through 150_N do not need to be separated from one another or separated from readout resonators (by coupling capacitors). Consequently, resonant units 150_1 through 150_N can be packed tightly together without an issue of losing state information because state information is not needed and without an issue of interference among each other.

Similar to typical qubits, the resonant units 150_1 through 150_N utilize Josephson junctions. A Josephson junction is formed by two superconductors coupled by, for example, a thin insulating barrier. A Josephson junction can be fabricated by means of an insulating tunnel barrier, such as $Al_2O_3$, between superconducting electrodes. For such Josephson junctions, the maximum supercurrent that can flow through the barrier is the critical current L.

FIGS. 5A, 5B, 5C, 5D, 5E, 5F, and 5G depict various resonant unit schematic configurations according to embodiments of the present invention. The resonant units 150_1 through 150_N can be implemented as any of the example in FIGS. 5A-5G. In FIGS. 5A-5G, each example resonant unit 150 includes a Josephson junction (JJ), an inductor L, and a capacitor C. The inductor L and capacitor C can include circuit components designed to exhibit a particular amount of inductance and capacitance, respectively, or can otherwise have the amount of inductance and capacitance present within the metal patterns and wiring of the circuit, for instance for the case of on-chip transmission lines, as understood by those skilled in the art. Along with the Josephson junction, a resonant unit 150 can be formed by combining capacitors and other inductors on the chip 102. The line-width of the resonance is determined by its coupling to the feed-line or other read-out circuitry, and must be made small enough to clearly distinguish each resonance in the frequency domain. As discussed herein, any Josephson junction can be converted into a short by applying enough current to breakdown the barrier material, therefore working similarly to a one-time programmable element.

The Josephson junction acts as an inductor and therefore contributes to the total inductance. Frequency addressability (i.e., the different frequencies for resonant units 150_1 through 150_N) can be enforced by changing the amount of inductance and/or changing the amount of capacitance from one resonant unit 150 to another. For example, more or less series inductance and/or parallel inductance can be adjusted (i.e., increased or decreased) from one resonant unit 150 to the next. Additionally, more or less series and/or parallel capacitance can be adjusted from one resonant unit 150 to the next. Larger or smaller Josephson inductance can be adjusted (i.e., increased or decreased) in each resonant unit 150. Even if the inductance of the inductor L and the capacitance of the capacitor C remain the same and the configuration (such as any configuration in FIGS. 5A-5G) is the same for each resonant unit 150_1 through 150_N, one or more of the resonant units have Josephson junctions that are shorted in order to cause the resonant units with the shorted Josephson junctions to have a resonant frequency outside the predefined frequency band, thereby providing the binary identification number based at least in part on a presence or absence of resonant frequencies within the predefined frequency band.

Figure 5D:
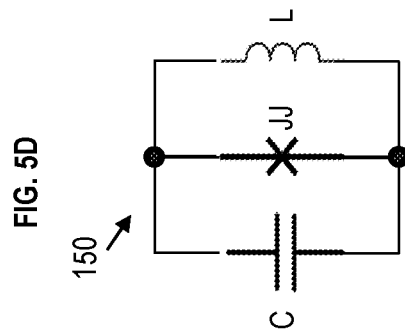
FIG. 5D depicts a schematic of a resonant unit configuration according to embodiments of the present invention.
Figure 5C:
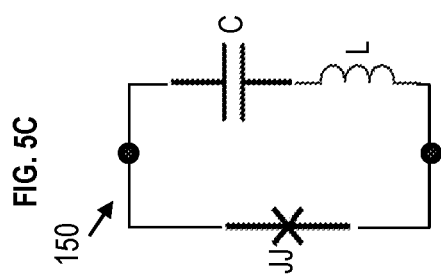
FIG. 5C depicts a schematic of a resonant unit configuration according to embodiments of the present invention.
Figure 5B:
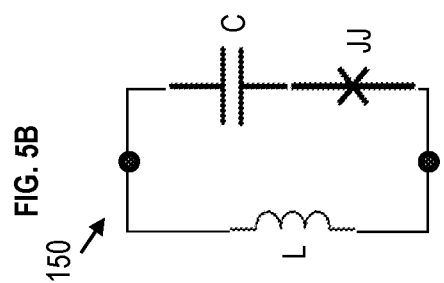
FIG. 5B depicts a schematic of a resonant unit configuration according to embodiments of the present invention.
Figure 5A:
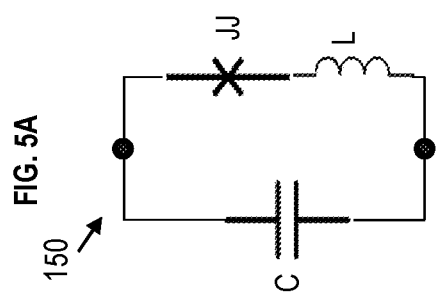
FIG. 5A depicts a schematic of a resonant unit configuration according to embodiments of the present invention.
Figure 5H:
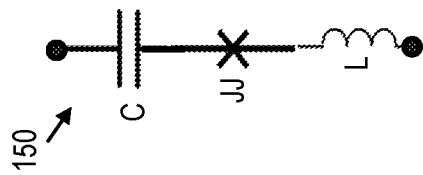
FIG. 5H depicts a schematic of a resonant unit configuration according to embodiments of the present invention.
Figure 5G:
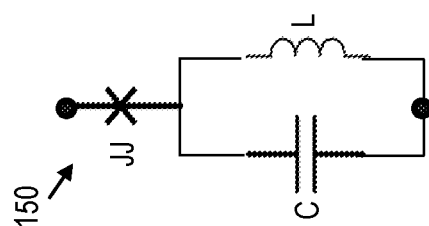
FIG. 5G depicts a schematic of a resonant unit configuration according to embodiments of the present invention.
Figure 5F:
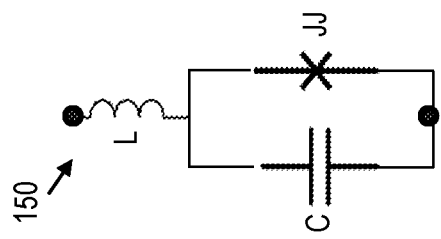
FIG. 5F depicts a schematic of a resonant unit configuration according to embodiments of the present invention.
Figure 5E:
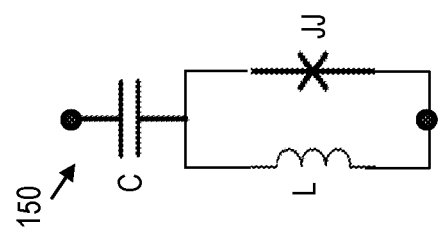
FIG. 5E depicts a schematic of a resonant unit configuration according to embodiments of the present invention.
Figure 6B:
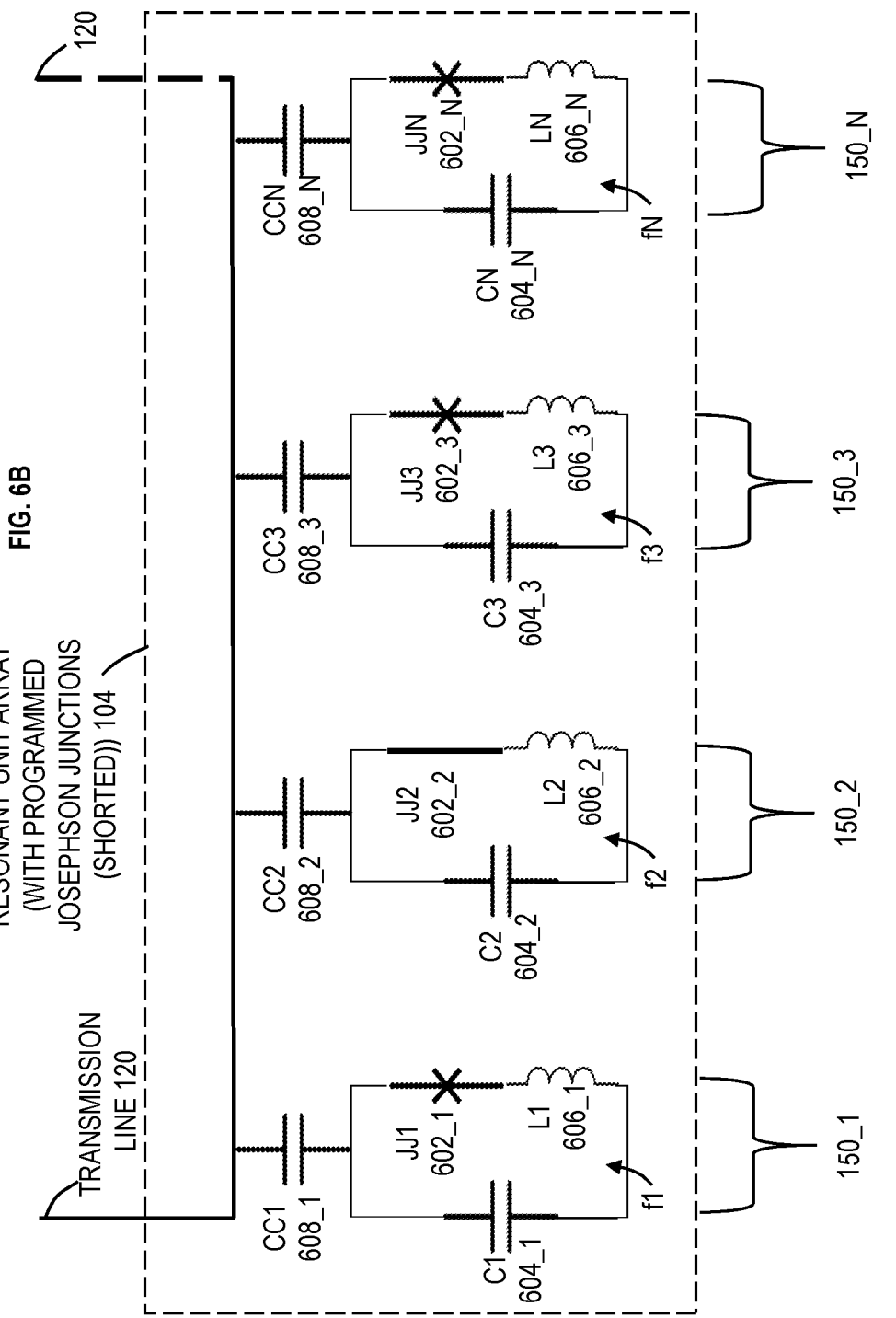
FIG. 6B depicts an example resonant unit array having been programmed according to embodiments of the present invention.

Taking the configuration of FIG. 5A as an example, FIGS. 6A, 6B, 7A and 7B illustrate example resonant unit arrays 104 according to embodiments of the present invention. FIG. 6A depicts a schematic of a resonant unit array 104 in which the resonant units 150_1 through 150_N are collectively addressed and the Josephson junctions have not been programmed. FIG. 6B depicts a schematic of a resonant unit array 104 in which the resonant unit 150_1 through 150_N are collectively addressed and Josephson junctions are programmed by inducing a short in a tunnel junction. In FIGS. 6A and 6B, the radio frequency signal is input to one transmission line 120 of the resonant unit array 104. The resonant unit array 104 can have only one transmission line 120 if operating in reflection. The resonant unit array 104 can have a second transmission line 120 if operating in transmission, which is shown with dashed lines. The dashed lines transmits the response back to the measurement equipment 106.

Figure 7A:
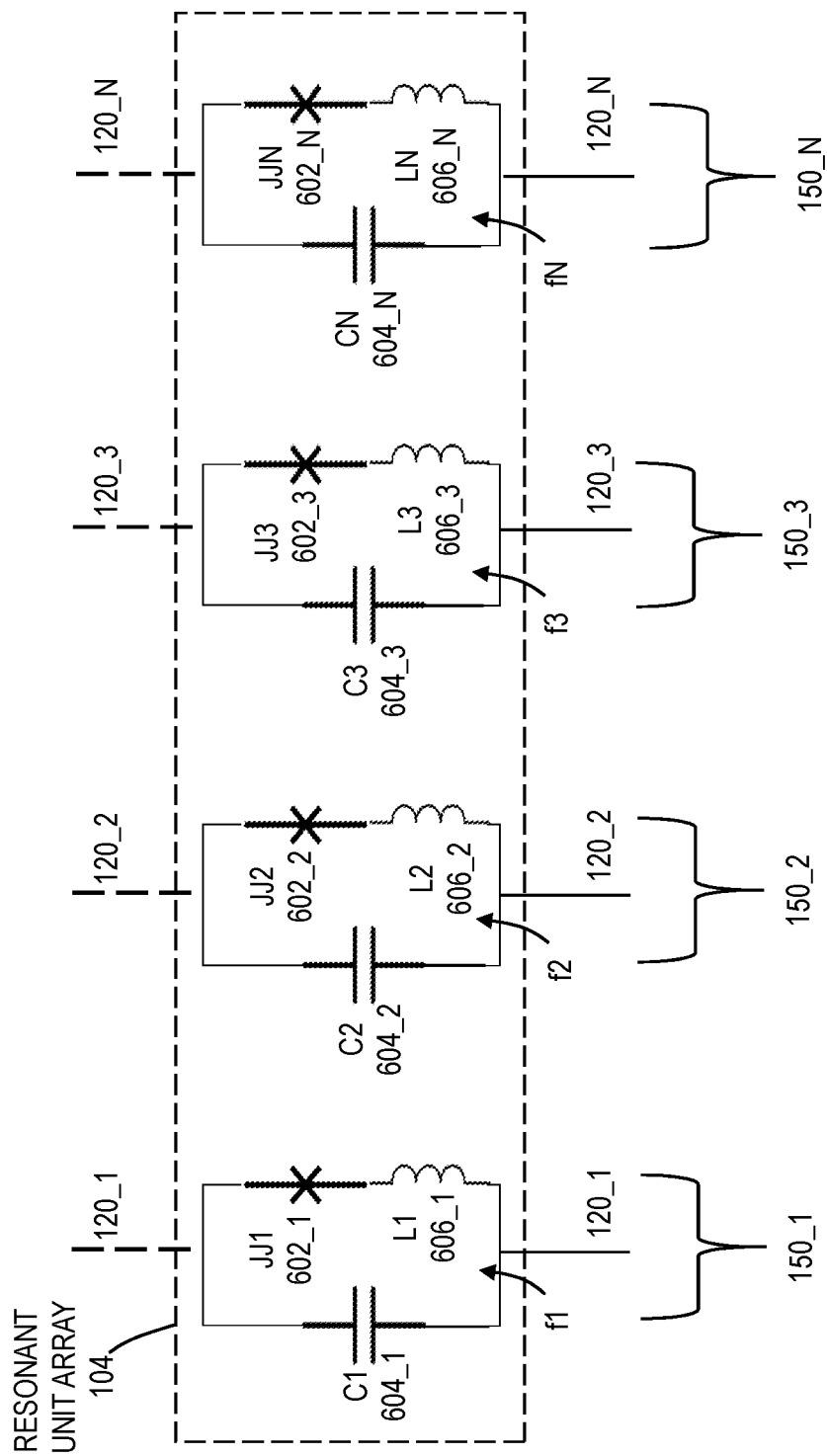
FIG. 7A depicts an example resonant unit array according to embodiments of the present invention.
Figure 7B:
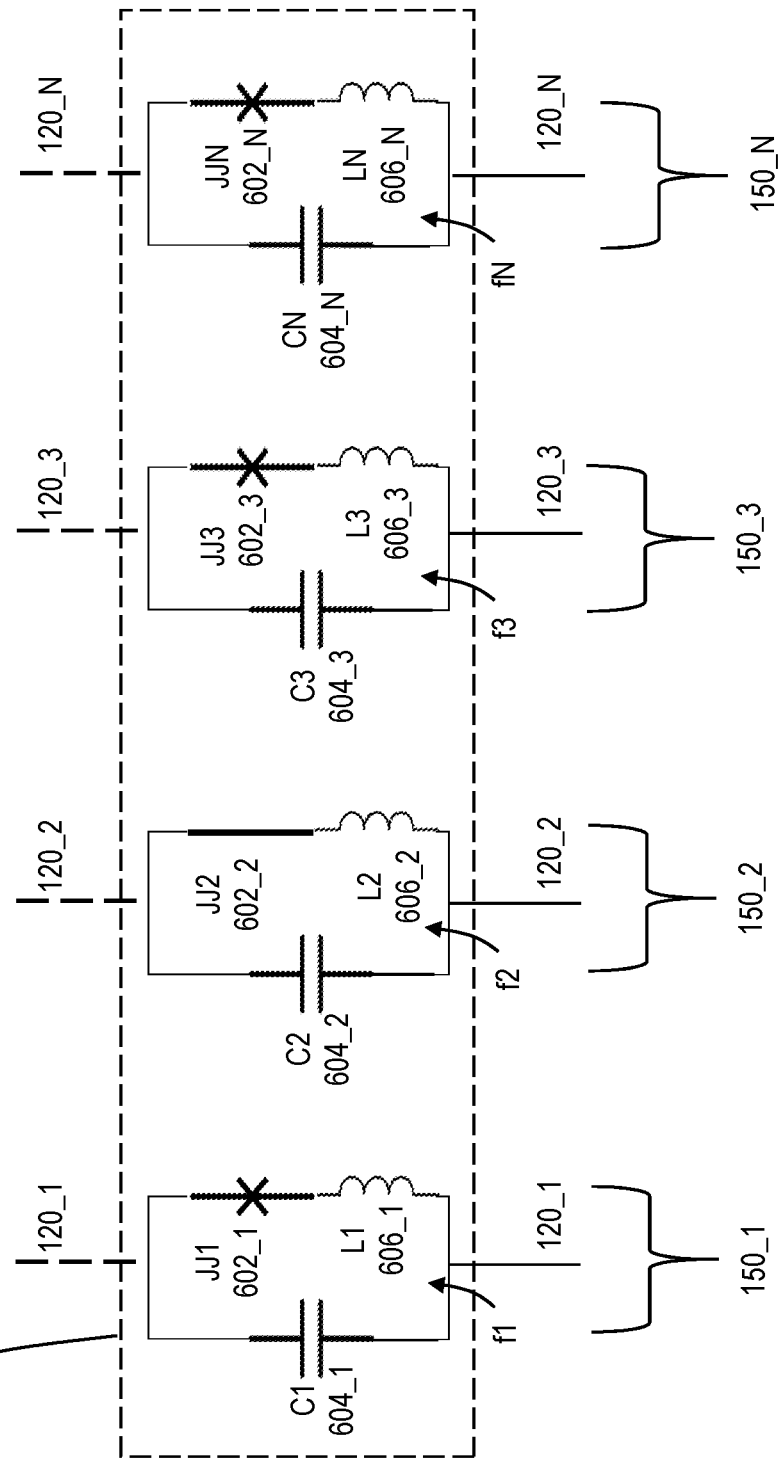
FIG. 7B depicts an example resonant unit array having been programmed according to embodiments of the present invention.

FIG. 7A depicts a schematic of a resonant unit array 104 in which the resonant units 150_1 through 150_N are individually addressed and the Josephson junctions are not programmed. FIG. 7B depicts a schematic of a resonant unit array 104 in which the resonant unit 150_1 through 150_N are individually addressed and Josephson junctions are programmed by inducing a short in a tunnel junction. In FIGS. 7A and 7B, the radio frequency signal is input to each of transmission lines 120_1 through 120_N of the resonant unit array 104. The resonant unit array 104 can have only one set of transmission lines 120_1 through 120_N if operating in reflection. The resonant unit array 104 can have a second set of transmission lines 120_1 through 102_N if operating in transmission, which is shown with dashed lines. The dashed lines transmits the response back to the measurement equipment 106.

Figure 6C:
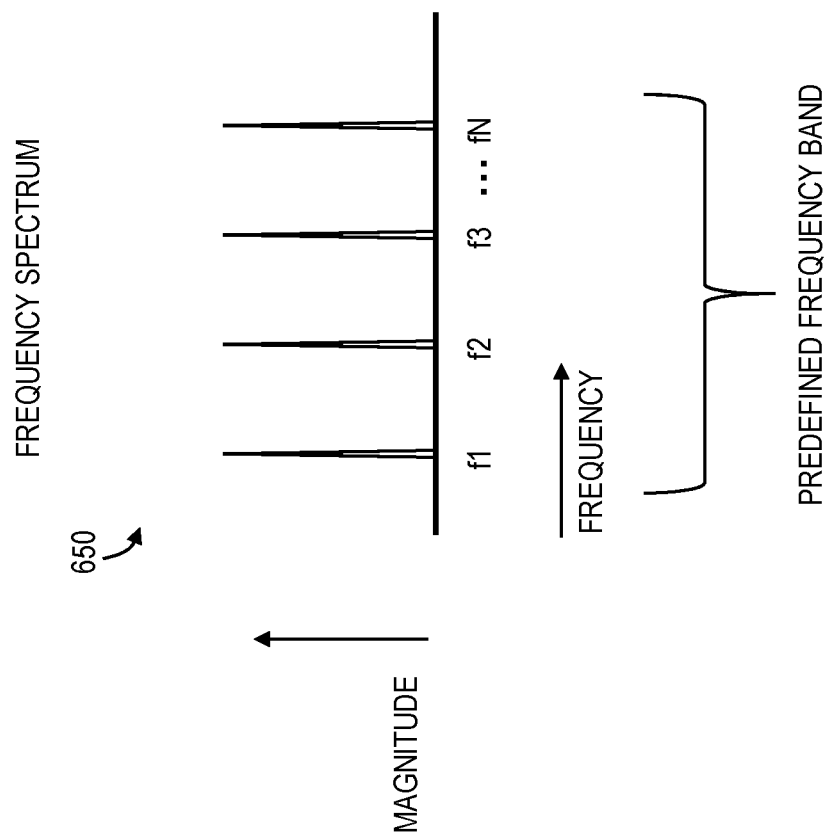
FIG. 6C depicts a frequency spectrum for non-programmed resonant unit array according to embodiments of the present invention.

FIGS. 6A, 6B, 7A, and 7B show that the resonant units 150_1 through 150_N include Josephson junctions 602_1 through 602_N, capacitors (C) 604_1 through 604_N, and inductors (L) 606_1 through 606_N. In FIGS. 6A, 6B, 7A, and 7B, the choice of resonant unit configuration is just an example, but each contains at least one Josephson junction. The choice of resonant unit 150 (and number of resonant units 150) is just an example. In FIGS. 6A and 6B, transmission line 120 can be capacitively coupled to resonant units 150_1 through 150_N by coupling capacitors (CC) 608_1 through 608_N. In some implementations, coupling inductors can be used in place of coupling capacitors. In other implementations, the coupling capacitors (CC) 608_1 through 608_N can be omitted. In FIGS. 6A and 7A, the capacitances of the capacitors 604_1 through 604_N are the same in this example, such that $C1=C2=C3\ldots=CN$, and the inductances of the inductors 606_1 through 606_N are not the same, such that $L1>L2>L3\ldots>LN$, thereby resulting in resonant frequencies f1, f2, f3, fN within the predefined frequency band (as shown in FIG. 6C), where $f1<f2<f3\ldots, fN$. FIG. 6C depicts a graph 650 of the frequency spectrum when the resonant unit array 104 is read out. FIG. 6C represents the readout of the resonant unit array 104 in FIGS. 6A and 7A via the measurement equipment 106 before any programming of the resonant units 150 (or Josephson junctions in the resonant units 150). In other words, the measurement equipment has transmitted radio frequency signals sweeping the frequency range (or frequency band) that matches/coincides with the resonant frequencies f1 through fN, in order for the measurement equipment 106 to receive the frequency response back from the resonant units 150_1 through 150_N shown in the frequency spectrum in FIG. 6C. As can be seen in the graph 650, each of the resonant frequencies f1 though fN has a magnitude that peaks, and the peaks can be greater than a predefined threshold. Although peaks in the frequency spectrum are utilized for explanation purposes, it should be noted that the measurement is not limited to measuring peaks. In other implementations, each of the peaks can be a dip depending on the measurement and other system parameters.

Magnitude can be representative of current, voltage, etc. When not programmed (i.e., no shorted Josephson junctions), the resonant units 150_1 through 150_N are designed to resonate or to have their resonant frequencies f1 through fN within a predefined frequency band. In some embodiments of the present invention, the predefined frequency band can be about 3-6 GHz. In other embodiments of the present invention, the predefined frequency band can be about 3-10 GHz. In some embodiments of the present invention, the predefined frequency band can be about 3-5 GHz. Each of the resonant units 150_1 through 150_N can be considered a bit. Also, each individual resonant frequency of resonant frequencies f1 through fN can be considered a bit. When measurement equipment 106 recognizes any of the resonant frequencies f1 through fN as a peak (e.g., above a predefined threshold) within the predefined frequency band, the measurement equipment 106 reads each peak of the resonant frequencies f1 through fN (or bit) as a 1. Each of the resonant frequencies f1 through fN (or bits) is a 1 in FIG. 6C.

In FIGS. 6B and 7B, the capacitances of the capacitors 604_1 through 604_N are the same in this example, such that $C1=C2=C3\ldots=CN$, and the inductances of the inductors 606_1 through 606_N are not the same, such that $L1>L2>L3\ldots>LN$, thereby resulting in resonant frequencies f1, f3, fN within the predefined frequency band, where $f1<f3\ldots fN<<<f2$. However, in FIGS. 6B and 7B, the resonant unit 150_2 has been programmed by shorting the Josephson junction 602_2 thereby causing the resonant frequency f2 to be outside of the predefined frequency band (as shown in FIG. 6D). The shorted Josephson junction 602_2 is depicted as a straight wire in the resonant unit 150_2 instead of an "X".

FIG. 6D depicts a graph 652 of the frequency spectrum when the resonant unit array 104 is read out. Unlike FIG. 6C, FIG. 6D represents the readout of the resonant unit array 104 in FIGS. 6B and 7B via the measurement equipment 106 after programming of the resonant units 150 (or Josephson junctions in the resonant units 150), and in this case, the resonant unit 150_2 is programmed (shorted Josephson junction 602_2). In other words, the measurement equipment has transmitted radio frequency signals sweeping the frequency range (or frequency band) that matches/coincides with the resonant frequencies f1 through fN, in order for the measurement equipment 106 to receive the frequency response back from the resonant units 150_1 through 150_N shown in the frequency spectrum in FIG. 6D. As can be seen in the graph 652, each of the resonant frequencies f1, f3 though fN has a magnitude that peaks in the predefined frequency band, and the peaks can be greater than a predefined threshold. Again, magnitude can be representative of current, voltage, etc. Because of the programming (i.e., shorted Josephson junction 602_2), the resonant frequency f2 of the resonant unit 150_2 is outside the predefined frequency band and therefore does not peak within the predefined frequency band. The resonant frequency f2 is expected to be located between the resonant frequencies f1 and f3 within the predefined frequency band when not programmed, as identified by expected frequency location 660. The expected frequency location 660 is where the peak for resonant frequency f2 would have been located if the Josephson junction 606_2 were not shorted. The measurement equipment 106 is configured to know in advance each of the expected frequency locations for each of the resonant frequencies f1 through fN, and to recognize when any peak is missing (just as for resonant frequency f2 which is missing in this example).

When measurement equipment 106 recognizes the resonant frequencies f1, f3 through fN as a peak (e.g., above a predefined threshold) within the predefined frequency band, the measurement equipment 106 correlates each peak of the resonant frequencies f1, f3 through fN (bits) as a 1 while the missing resonant frequency f2 (bit) corresponds to a 0. The measurement equipment 106 is configured to identify each of the resonant frequencies f1 through fN (bits) as a 1 or 0 within the predefined frequency range, according to whether the corresponding resonant unit 150_1 through 150_N has a shorted Josephson junction. In this example of FIG. 6D (corresponding to readout of the resonant unit array 104 depicted in FIGS. 6B and 7B), the binary sequence for this identification is 1011, where 1 corresponds to an intact junction and 0 corresponds to a shorted junction (again this is an arbitrary convention and can be vice versa).

The Josephson junctions can be nominally identical. The choice of resonant unit 150_2 is being utilized as an example as the programmed resonant unit, but each resonant unit 150_1 through 150_N contains a Josephson junction, and one or more resonant units 150_1 though 150_N can be programmed as desired. The choice of element (and number of elements) which is Josephson junction 602_2 to be changed for addressability is just an example. In the example depicted in FIGS. 6B and 7B, the resonant unit 150_2 is programmed which means that the Josephson junction 602_2 is shorted. Accordingly, if inductance of inductor L2 606_2 is much smaller than that of the Josephson junction 602_2, the resonant frequency f2 becomes too large compared to the others resonant frequencies f1, f3 through fN and is therefore outside of the predefined frequency band checked for (i.e., considered) by the measurement equipment 106. For explanation purposes, the response for resonant frequency f2 (which has been increased because of the short circuit (decreased Josephson inductance)) is shown as very high in frequency compared to the predefined frequency band. It is noted that frequency has an inverse relationship to inductance. More particularly, the frequency has an inverse square root relationship to inductance.

It should be appreciated that the resonant unit arrays 104 depicted in FIGS. 1-7 are for example. It should be noted that one or more embodiments of the present invention can include a circuit (i.e., chip 102) and/or system 100 having multiple resonant units 150_1 through 150_N containing Josephson junctions 602_1 through 602_N, where the resonant units 150_1 through 150_N are coupled to a readout mechanism (such as measurement equipment 106) in order to read out a sequence of analog resonant frequencies signatures (i.e., bits), thereby providing an identification of the chip 102. The circuit can be a hanger-style transmission line or a microwave cavity. In some implementations, individually addressed resonant units can be made with individual patterned readouts (as depicted in FIGS. 2, 4, 7A, 7B). Although having individually addressed resonant units on chip 102 consumes more real estate, this allows though for the Josephson junctions (along with inductors L and capacitors C) to be made identical (i.e., with the same resonant frequency) to one another in the resonant unit array 104, because Josephson junctions are addressed by their respective location in their individual resonant units 150_1 through 150_N.

In other implementations, in the resonant unit array 104, the Josephson junctions (in respective resonant units 150_1 through 150_N) can be made slightly different from one resonant unit 150 to the next. For example, the Josephson junctions 602_1 through 602_N (in respective resonant units 150_1 through 150_N) can be made with different sizes, made with different critical currents $I_c$, made with different capacitive loads (i.e., different values for capacitors C1 604_1 through CN 604_N), and/or made with different inductive loads (i.e., different values for inductors L1 606_1 through LN 606_N) in order to identify each bit by a predictable analog frequency range. That is, one can have f1<f2<f3 . . . fN or vice versa for the resonant units 150_1 through 150_N. Each bit is a resonant frequency of the resonant units 150_1 through 150_N, such that the measured resonant frequency f1 is the bit for resonant unit 150_1, measured resonant frequency f2 is the bit for resonant unit 150_2, through measured resonant frequency fN is the bit for resonant unit 150_N. The chip 102 can represent numerous chips. A chip 102 can have 128 bits thereby having 128 resonant units 150 such that there are 128 resonant frequencies that are measured out. In one implementation, the resonant unit array 104 would utilize less space on the chip 102 when the 128 resonant units 150 are addressed and measured collectively because one transmission line 120 is needed for readout in reflection or two transmission lines 120 needed for readout in transmission. Having so many resonant units 150 (e.g., 128 bits, 64 bits, 32 bits, etc.) packed tightly is no problem for chip 102 because coherence is not a concern for operation as noted above.

Figure 8:
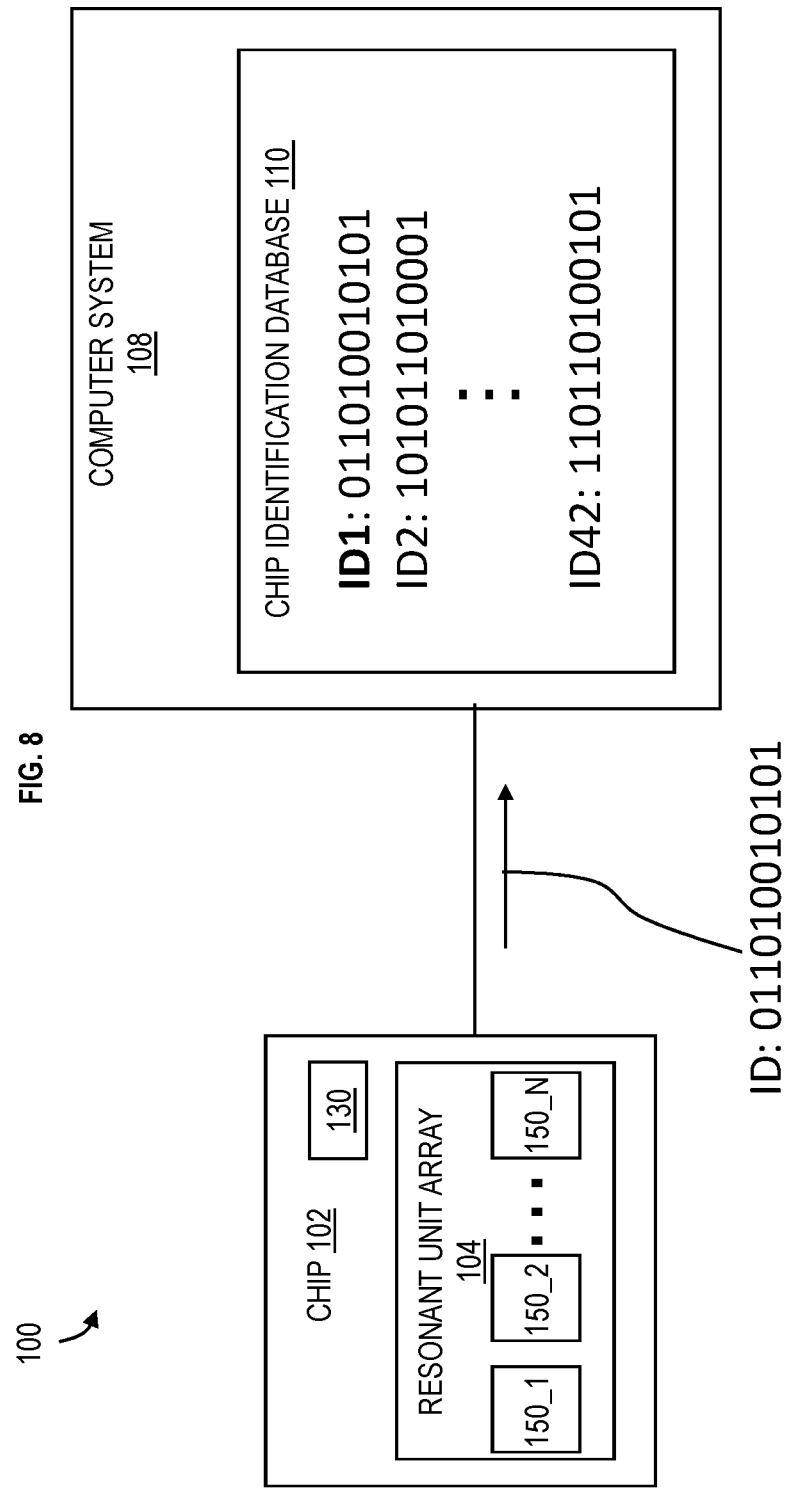
FIG. 8 depicts example authentication of a superconducting chip according to embodiments of the present invention.

To illustrate authentication after readout of the chip 102, FIG. 8 depicts an example of authentication of the chip 102 according to embodiments of the present invention. FIG. 8 only shows a simplified view of the system 100 so as not to obscure the figure. It should be appreciated that FIG. 8 includes all elements discussed in FIGS. 1-7. In FIG. 8, it is assumed that the identification of the chip 102 has been read out and the measurement equipment 106 has identified the any resonant frequencies f1 through fN that have peaks (at or above a predefined threshold) and have no peaks (below a predefined threshold) within the predefined frequency band. Once identification is read out, the measured identification can be checked (by the measurement equipment 106/computer system 108) against the chip identification database 110. For a given number of resonant units 150, the chip 102 is read out with identification 011010010101. The computer system 108 is configured to compare this readout identification against each of the identification numbers in the chip identification database 110. Upon finding a match, the computer system 108 is configured to identify the chip 102 by its identification number. In the example of FIG. 8, the identification is recognized as chip 1 (or chip XYZ) because the readouts are a match (i.e., the previously stored identification 011010010101 for ID1 matches the readout identification for chip 102).

The choice of Josephson junctions to be shorted can be selected by an operator during the manufacturing/fabrication of the resonant units 150_1 through 150_N. The manufacturer can fabricate numerous superconducting chips 102, such that each has a unique identification number. Although the resonant unit 150_2 (having resonant frequency f2) has be utilized as an example in some scenarios, embodiments of the present invention can have any amount of Josephson junctions shorted while not having other Josephson junctions shorted.

Figure 12A:
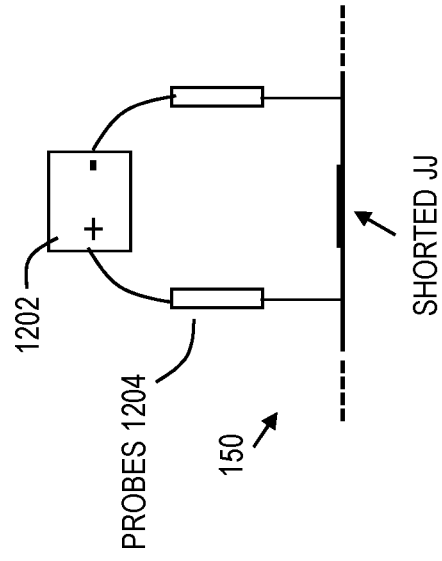
FIG. 12A depicts a partial view of a resonant unit having a non-shorted Josephson junction according to embodiments of the present invention.
Figure 12B:
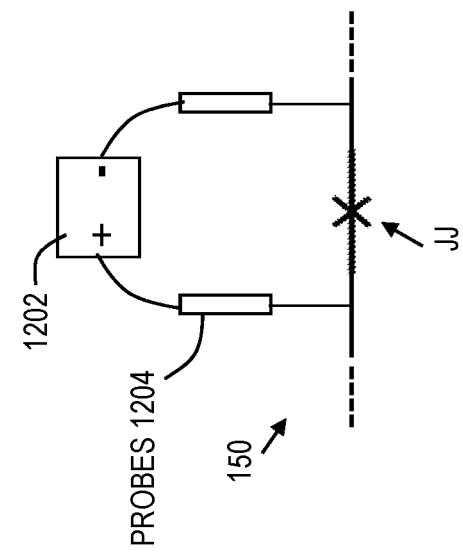
FIG. 12B depicts a partial view of the resonant unit having a shorted Josephson junction according to embodiments of the present invention.

As noted herein, there are many techniques for shorting Josephson junctions (i.e., shorting the tunnel barrier). FIG. 12A depicts a partial resonant unit 150 that only shows a non-shorted Josephson junction (e.g., any of the Josephson junction 602_1 through 602_N) according to embodiments of the present invention. FIG. 12A is an example of using electrical probes with a high current to short the Josephson junction. In FIG. 12A, a power source 1202 is connected to both sides of the Josephson junction via two probes 1204. The power source 1202 can be a voltage source or current source for shorting the Josephson junction. One of the probes can be connected to a positive polarity and the other probe can be connected to a negative polarity of the power source 1202. Electrical current is applied via probes 1204 connected to power source 1202 such that the magnitude of the electrical current breaks down the tunnel barrier of the Josephson junction, thereby causing the Josephson junction to be shorted. An example amount of current to short a Josephson junction can range from 100 µA to 100 mA. After applying the electrical current, FIG. 12B depicts a partial resonant unit 150 that only shows the shorted Josephson junction (e.g., any of the Josephson junctions 602_1 through 602_N can be shorted) according to embodiments of the present invention. In some embodiments of the present invention, the Josephson junctions can be designed with probing pads for the electrical probes 1204, and the probing pads can be made custom for automated programming.

There are other techniques for shorting the Josephson junction. FIG. 13A depicts a partial resonant unit 150 that only shows a non-shorted Josephson junction (e.g., any of the Josephson junction 602_1 through 602_N) according to embodiments of the present invention. FIG. 13A illustrates using the beam from, for example, an electron beam device 1302 to short the Josephson junction. The electron beam device 1302 can be a scanning electron microscope, electron beam gun, etc. In FIG. 13A, the electron beam device 1302 emits an electron beam 1304 on the Josephson junction. The electron beam 1304 is emitted with a magnitude that creates electrical current in the Josephson junction suitable to break down the tunnel barrier of the Josephson junction, thereby causing the Josephson junction to be shorted. After applying the electron beam, FIG. 13B depicts a partial resonant unit 150 that only shows the shorted Josephson junction (e.g., any of the Josephson junction 602_1 through 602_N can be shorted) according to embodiments of the present invention. Any chip 102 can have its Josephson junctions shorted to generate a chip identification number. There can be numerous superconducting chips 102 in a server farm of quantum computers. One of the chips can have no shorted Josephson junctions, thereby resulting in a chip identification number such as 1111, and this chip identification number is distinguishable from other chips 102 having one or more shorted Josephson junction in the server farm.

Before discussing various flow charts of the superconducting chips 102 below, and a generalized scenario for the superconducting chips 102 is now discussed. A set/collection of identical superconducting qubit (circuit) chips 102 is fabricated. As noted herein, discussion of the superconducting chip 102 can represent numerous chips 102. A unique identification code (i.e., chip identification) is programed into each one of the superconducting chips 102. Each of the superconducting chips 102 can be installed into its own cryostat in the user's qubit-circuit farm. A cryostat is a device, such as a dilution refrigerator, used to maintain low cryogenic temperatures. While operating the numerous superconducting chips 102, the identification codes can be utilized to distinguish each among these otherwise-identical chips 102.

FIG. 9 depicts a flow chart 900 of a method of forming a superconducting chip 102 according to embodiments of the present invention. Various operations in FIG. 9 can be performed prior to installation in cryostat. At block 902, resonant units 150_1 through 150_N having resonant frequencies are provided, and the resonant units are configured as superconducting resonators. At block 904, Josephson junctions 602_1 through 602_N are in the resonant units 150_1 through 150_N where one or more of the Josephson junctions 602_1 through 602_N are caused to have a shorted tunnel barrier. An operator/manufacturer during fabrication of the resonant units 150_1 through 150_N can short any of the Josephson junctions 602_1 through 602_N. In one example, a Josephson junction can be shorted by using electrical probes to apply electrical current to break down the tunnel barrier material in the Josephson junction.

The shorted tunnel barrier for the one or more of the Josephson junctions 602_1 through 602_N causes an increase in the resonant frequencies for the resonant units having the shorted tunnel barrier. For example, as a result of the shorted tunnel barrier in Josephson junction 602_2, the resonant frequency f2 can been increased from, for example, 4 GHz to 15 GHz. Resonant frequency f2 is only utilized as an example. Some of the Josephson junctions have no shorted tunnel barrier.

The resonant frequencies (e.g., resonant frequencies f1, f3, f5, f7, f9, etc.) are designed to fall within a predefined frequency band for the resonant units having no shorted tunnel barrier in the Josephson junctions. The resonant frequencies (e.g., resonant frequencies f2, f4, f6, f8, f10, etc.) for the one or more of the resonant units having the shorted tunnel barriers are designed to fall outside of the predefined frequency band.

The one or more of the Josephson junctions having the shorted tunnel barrier are predefined in advance in order to provide a predefined chip identification. The Josephson junctions in the superconducting chips 102 are not accidentally shorted and are not in arbitrary Josephson junctions. The Josephson junction is structured to have a first configuration or a second configuration, wherein the first configuration is a typical Josephson junction defined as not being a short and the second configuration is the shorted Josephson junction. The first configuration is a non-shorted Josephson junction, and the non-shorted Josephson junction has a tunnel barrier defined as not being shorted. The second configuration is a shorted Josephson junction, and the shorted Josephson junction is defined as having the shorted tunnel barrier.

A combination of the first configuration and the second configuration defines a binary representation, for example 101010101. A combination of the resonant frequencies, associated with first configuration and the second configuration, defines a binary representation. The resonant units having the Josephson junctions without the shorted tunnel barrier are configured to be read out as a first binary number (e.g., a "1"). The resonant units having the one or more of the Josephson junctions with the shorted tunnel barrier are configured to be read out as a second binary number (e.g., a "0").

FIG. 10 is a flow chart 1000 of a method of identifying a chip 102 according to embodiments of the present invention. At block 1002, first resonant frequencies (e.g., resonant frequencies f1, f3, f5, f7, f9, etc.) and second resonant frequencies (e.g., resonant frequencies f2, f4, f6, f8, f10, etc.) are received by the measurement equipment 106. The first resonant frequencies are in a predefined frequency band, and the second resonant frequencies are outside of the predefined frequency band, where the second resonant frequencies each have an expected frequency location (just like expected frequency location 660) in the predefined frequency band. It should be noted that this is done while the chip 102 is installed in a cryostat for qubit operation, and this action can employ systems or equipment for sending/receiving microwave signals that are same or identical to the systems/equipment used for reading qubits.

At block 1004, the measurement equipment 106 (and/or the computer system 108) is configured to correlate a first representation (e.g., 1) to each of the first resonant frequencies in the predefined frequency band. At block 1006, the measurement equipment 106 (and/or the computer system 108) is configured to correlate a second representation (e.g., 0) to the expected frequency location for each of the second resonant frequencies, wherein a combination of the first and second representations (ones (1) and zeros (0)) identify the chip 102.

The first representation is selected from the group consisting of a number, a symbol, and/or a letter (e.g., X). The second representation is selected from the group consisting of another number, another symbol, and/or another letter (e.g., Y).

FIG. 11 is a flow chart 1100 of a method of causing identification of a chip 102 according to embodiments of the present invention. At block 1102, the measurement equipment 106 is configured to cause the chip 102 to provide resonant frequencies f1 through fN from resonant units 150_1 through 150_N, where the resonant frequencies include first resonant frequencies (e.g., resonant frequencies f1, f3, f5, f7, f9, etc.) within a predefined frequency band and second resonant frequencies (e.g., resonant frequencies f2, f4, f6, f8, f10, etc.) outside of the predefined frequency band. The second resonant frequencies each have an expected frequency location (just like the expected frequency location for f2) in a different predefined frequency band.

At block 1104, the measurement equipment 106 is configured to correlate a first representation (e.g., 1) to each of the first resonant frequencies in the predefined frequency band and a second representation (e.g., 0) to the expected frequency location (just like for the expected/missing frequency location for f2) for each of the second resonant frequencies, where a combination of the first and second representations is a present identification of the chip 102.

At block 1106, the measurement equipment 106 (and/or the computer system 108) is configured to determine that a previously stored identification (in the chip identification database 110) is a match to the present identification of the chip 102. It should be noted that the chip identification can work (i.e., find a match) even if the second resonant frequencies (outside of the predefined frequency band) are not clearly measured by the measurement equipment 106, i.e. if only these resonances' absence from the whole set is observable.

In response to the match, the measurement equipment 106 (and/or the computer system 108) is configured identify the chip 102 having the present identification from different chips (in the database 110) having different identifications.

There are many scenarios of how the superconducting chips 102 can be utilized, and identification of a particular chip 102 among other chips 102 can include various processes. First, after chip manufacturing, and often performed at the manufacturer's site, the chip identification is created (by an operator who programs the chip identification into the chip 102) and stores it in the chip identification database 110. This process is typically known as enrollment. After the chip 102 is deployed in the field at a user facility, the chip identification can be read out and communicated back to the manufacturer. Then, the manufacturer performs a search in its chip identification database 110 for the communicated chip identification. The chip identification can consist of an identifier and some chip-specific information, such as hardware grade (fast or slow, for example), number of qubits in the system (17, 49, for example), date of manufacture, manufacturing facility, etc. When requesting identification, the user can be trying to ascertain if the chip 102 is authentic by verifying its existence in the manufacturer's chip identification database 110. When requesting identification, the user can be trying to initiate communication with a third party's server with mediation by the manufacturer, who can authenticate the user's chip identification as trustworthy and grant it permission to access the third party's server upon searching for the chip identification in its chip identification database 110. When requesting identification, the user can be deciding how to distribute workloads across the network of existing chips 102 and finding available quantum processors (generally or with a particular property such as hardware grade). It should be appreciated that there are many ways to take advantage of superconducting qubit chips 102 programmed with (unique) chip identifications.

The circuit elements of the circuits 102, 104, 120, 130 can be made of superconducting material. The respective resonators and transmission/feed/probe signal lines are made of superconducting materials. Examples of superconducting materials (at low temperatures, such as about 10-100 millikelvin (mK), or about 4 K) include niobium, aluminum, tantalum, etc. For example, the Josephson junctions are made of a thin tunnel barrier, such as an oxide, or a weak link, separating two superconducting electrodes. The capacitors can be made of superconducting material separated by a gap or a dielectric material. The transmission lines (i.e., wires) connecting the various elements are made of a superconducting material.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device. On-chip superconducting circuits described here are created by adapting the techniques of semiconductor fabrication to the formation of needed patterns in superconducting metal films on a semiconductor substrate.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of identifying a superconducting chip comprising:
   receiving first resonant frequencies and second resonant frequencies, the first resonant frequencies being in a predefined frequency band, the second resonant frequencies being outside of the predefined frequency band, wherein the second resonant frequencies each have an expected frequency location in a different predefined frequency band;
   correlating a first representation to each of the first resonant frequencies in the predefined frequency band; and
   correlating a second representation to the expected frequency location for each of the second resonant frequencies, wherein a combination of the first and second representations identify the superconducting chip.

2. The method of claim 1, wherein the first representation is selected from the group consisting of a number, a symbol, and a letter.

3. The method of claim 2, wherein the second representation is selected from the group consisting of another number, another symbol, and another letter.

4. The method of claim 1, wherein the superconducting chip comprises resonant units having resonant frequencies, the resonant units comprising Josephson junctions; and
   wherein one or more of the Josephson junctions are configured to have a shorted tunnel barrier.

5. The method of claim 4, wherein the shorted tunnel barrier causes an increase in the resonant frequencies for the resonant units having the shorted tunnel barrier.

6. The method of claim 4, wherein some of the Josephson junctions have a tunnel barrier that is not shorted.

7. The method of claim 4, wherein one or more of the Josephson junctions are configured to have no shorted tunnel barrier, and wherein the resonant frequencies are designed to fall within the predefined frequency band for each of the resonant units having no shorted tunnel barrier in the Josephson junctions.

8. The method of claim 7, wherein the resonant frequencies for the resonant units having the shorted tunnel barrier are designed to fall outside of the predefined frequency band.

9. The method of claim 4, wherein the Josephson junctions having the shorted tunnel barrier are predefined in advance in order to provide a predefined chip identification.

10. The method of claim 4, wherein the Josephson junctions are structured to have a first configuration or a second configuration.

11. The method of claim 10, wherein the first configuration is a non-shorted Josephson junction, the non-shorted Josephson junction having a tunnel barrier defined as not being shorted.

12. The method of claim 11, wherein the second configuration is a shorted Josephson junction, the shorted Josephson junction being defined as having the shorted tunnel barrier.

13. The method of claim 10, wherein a combination of the first configuration and the second configuration defines a binary representation.

14. The method of claim 10, wherein a combination of the resonant frequencies, associated with the first configuration and the second configuration, defines a binary representation.

15. The method of claim 4, wherein one or more of the Josephson junctions are configured to have no shorted tunnel barrier, and wherein the resonant units having the Josephson junctions without the shorted tunnel barrier are configured to be read out as a first binary number.

16. The method of claim 15, wherein the resonant units having the one or more of the Josephson junctions with the shorted tunnel barrier are configured to be read out as a second binary number.

17. A method of causing identification of a superconducting chip comprising:
    causing the superconducting chip to provide resonant frequencies from resonant units, the resonant frequencies including first resonant frequencies within a predefined frequency band and second resonant frequencies outside of the predefined frequency band, wherein the second resonant frequencies each have an expected frequency location in a different predefined frequency band;
    correlating a first representation to each of the first resonant frequencies in the predefined frequency band and a second representation to the expected frequency location for each of the second resonant frequencies, wherein a combination of the first and second representations is a present identification of the superconducting chip; and
    determining that a previously stored identification is a match to the present identification of the superconducting chip.

18. The method of claim 17, further comprising in response to the match, identifying the superconducting chip having the present identification from different chips having different identifications.

19. The method of claim 17, wherein the resonant units comprise Josephson junctions.

20. The method of claim 19, wherein one or more of the Josephson junctions are configured to have a shorted tunnel barrier.

* * * * *